United States Patent
Thorne et al.

(10) Patent No.: US 9,311,288 B2
(45) Date of Patent: Apr. 12, 2016

(54) ELECTRONIC BOOK READER

(75) Inventors: Samuel John Thorne, London (GB);
Henry Newton-Dunn, Los Angeles, CA (US); Aleix Ingles Elias, London (GB); Satoshi Araki, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 811 days.

(21) Appl. No.: 13/181,098

(22) Filed: Jul. 12, 2011

(65) Prior Publication Data

US 2013/0015954 A1    Jan. 17, 2013

(51) Int. Cl.
G06F 17/24    (2006.01)
G06F 3/0483   (2013.01)
G06F 15/02    (2006.01)
G06F 17/21    (2006.01)
G06F 3/0488   (2013.01)
G06Q 20/12    (2012.01)
H04L 29/08    (2006.01)

(52) U.S. Cl.
CPC .......... *G06F 17/241* (2013.01); *G06F 3/04883* (2013.01); *G06F 15/0291* (2013.01); *H04L 67/06* (2013.01); *G06F 3/0483* (2013.01); *G06F 17/211* (2013.01); *G06F 17/212* (2013.01); *G06Q 20/123* (2013.01); *G09G 2380/14* (2013.01)

(58) Field of Classification Search
CPC ............... G07C 9/00111; H04L 29/06; H04L 29/08072; G06Q 10/10
USPC ............ 340/8.1; 709/225, 217, 205, 511, 102
See application file for complete search history.

(56) References Cited

U.S. PATENT DOCUMENTS

| | | | | |
|---|---|---|---|---|
| 7,290,285 | B2 * | 10/2007 | McCurdy et al. | 726/27 |
| 7,877,460 | B1 * | 1/2011 | Brouwer et al. | 709/217 |
| 8,180,370 | B2 * | 5/2012 | Kim et al. | 455/456.1 |
| 8,194,001 | B2 * | 6/2012 | Miller et al. | 345/1.3 |
| 8,371,855 | B1 * | 2/2013 | Gayles et al. | 434/51 |
| 8,613,061 | B2 * | 12/2013 | Dvorak et al. | 726/5 |
| 2010/0146115 | A1 * | 6/2010 | Bezos | 709/225 |
| 2010/0178939 | A1 * | 7/2010 | Kang et al. | 455/456.3 |
| 2011/0045816 | A1 * | 2/2011 | Wang et al. | 455/420 |

OTHER PUBLICATIONS

URL: http://www.amazon.co.uk/gp/help/customer/display.html/ref=hp_200504440_kcus_pubnotes?nodele-200504440#publicnotes, "Customise Your Reading", Amazon.co.uk Help: Customise Your Reading, Jul. 12, 2011, 14 pages.

* cited by examiner

*Primary Examiner* — Mohamed Barakat
(74) *Attorney, Agent, or Firm* — Oblon, McClelland, Maier & Neustadt, L.L.P.

(57) ABSTRACT

A data processing system comprises a plurality of electronic book reader devices, each of the electronic book reader devices having a display and being connectable to a wireless network of electronic book reader devices, in which: a first electronic book reader device of the plurality comprises a data transmitter configured to send, via the wireless network, reading position data defining: a current book data file being displayed by that electronic book reader device, and a current display position within that book data file; and at least a second, different, electronic book reader device of the plurality comprises a data receiver configured to receive, via the wireless network, the reading position data sent by the first electronic book reader device, and a display controller configured to control the second electronic book reader device to display at least an indication of the current book data file and the current display position of the first electronic book reader device.

17 Claims, 17 Drawing Sheets

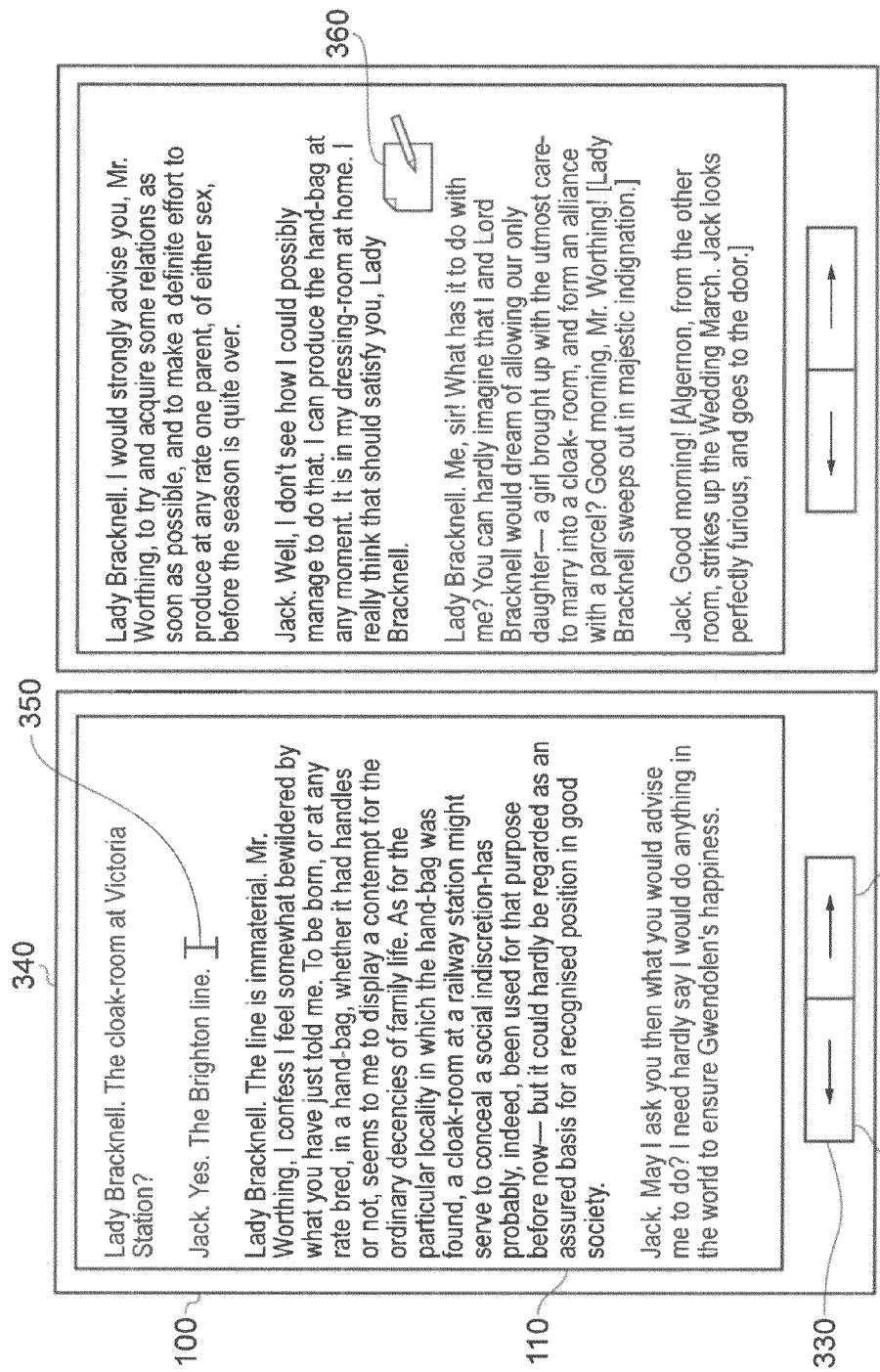

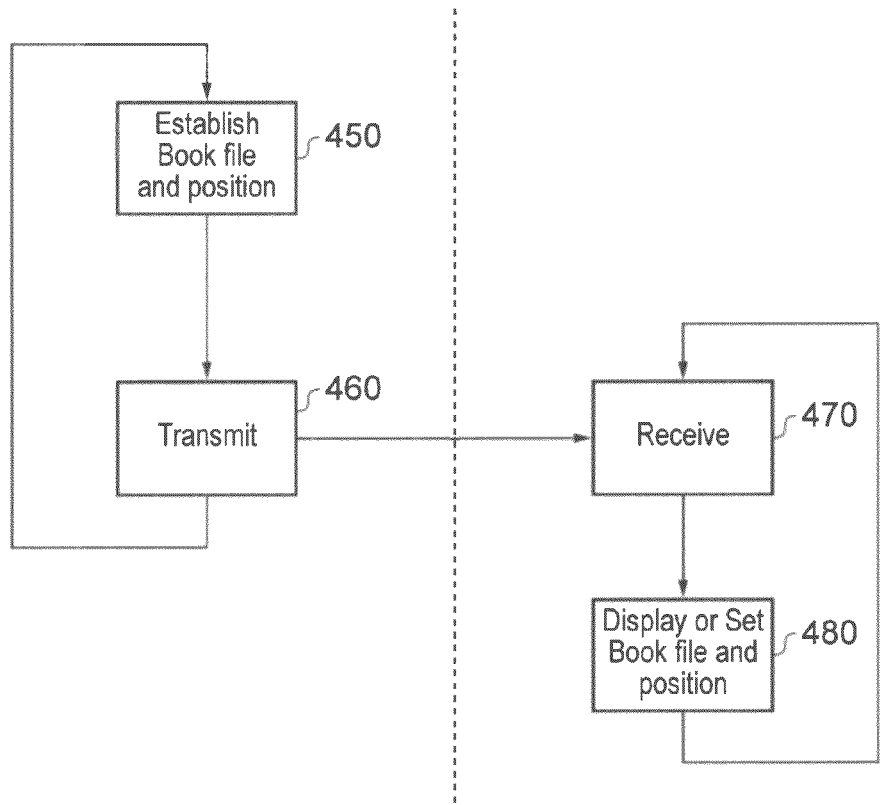
FIG. 7
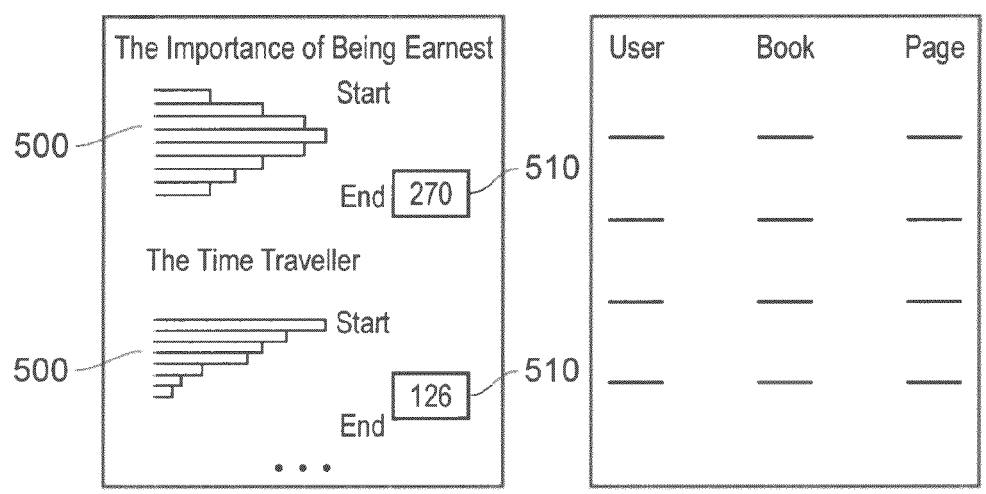
FIG. 8
FIG. 9

| Book | Start | End |
|------|-------|-----|
| A | A1 | A2 |
| B | B1 | B2 |
| C | C1 | C2 |

ELECTRONIC BOOK READER

BACKGROUND OF THE INVENTION

1. Field of the Invention

This invention relates to electronic book readers.

2. Description of the Prior Art

The term "electronic book" or "e-book" signifies a data file representing a book or other published document in a form suitable for display on an e-book "reader". The reader is generally a hand-held device which allows a user to read electronic documents such as e-books on a display screen. Often the display screen makes use of so-called "electronic paper", which is a type of display technology which relies on reflected light (rather than backlighting) and which uses electrical power only to change the information which is displayed, rather than to maintain the display of a particular page. These features can mean that e-book readers have a long battery life, and that the experience of viewing an e-book reader is more similar to reading a physical book than it is to viewing a computer screen.

E-book distribution and e-book readers are rapidly growing in popularity. From the point of view of the consumer, an e-book reader allows the user to carry a large number of e-books in a small device. It is considered easier and quicker to purchase an e-book, requiring just a data downloading process, than to purchase a physical book via a visit to a physical bookstore or a postal delivery. E-book distribution also has advantages for the publisher and retailer. It can be much cheaper to maintain a server which sells e-books than to carry real inventory of physical books in shops and warehouses.

E-books allow users to generate and share electronic comments and notes via a central server. Examples of such arrangements are disclosed in: http://www.amazon.co.uk/gp/help/customer/display.html/ref=hp_200504440_kcus_pubnotes?nodeId=200504440#publicnotes. This reference discusses techniques whereby a user can write a note in respect of a particular passage of an e-book. The note can then be passed to a central server, from which it can be distributed to and read by other users who own the same e-book.

It is an object of the present invention to provide improvements in or relating to e-book readers and/or e-book distribution.

SUMMARY OF THE INVENTION

This invention provides an electronic book reader device comprising:

a data transmitter configured to send, via a wireless network, reading position data defining: a current book data file being displayed by that electronic book reader device, and a current display position within that book data file;

a data receiver configured to receive, via the wireless network, reading position data sent by another electronic book reader device; and a display controller configured to display at least an indication of the current book data file and the current display position of the other electronic book reader device.

This invention also provides a data processing system comprising a plurality of electronic book reader devices, each of the electronic book reader devices having a display and being connectable to a wireless network of electronic book reader devices, in which:

a first electronic book reader device of the plurality comprises a data transmitter configured to send, via the wireless network, reading position data defining: a current book data file being displayed by that electronic book reader device, and a current display position within that book data file; and at least a second, different, electronic book reader device of the plurality comprises a data receiver configured to receive, via the wireless network, the reading position data sent by the first electronic book reader device, and a display controller configured to control the second electronic book reader device to display at least an indication of the current book data file and the current display position of the first electronic book reader device.

This invention also provides an electronic book distribution system comprising:

a printed code for distribution to a book purchaser;

a server configured to store one or more electronic book data files;

an electronic code reader configured to read a printed code relating to a book purchaser, and to communicate with the server to request the server to transfer an electronic copy of a book relating to that printed code to an electronic book reader device associated with that book purchaser.

This invention also provides an electronic book distribution system for use with an electronic book reader device having a display and being configured to store metadata associated with respective reading positions within an electronic book data file and to display a representation of an item of metadata if the respective reading position of the electronic book data file is currently being displayed on the display, the system comprising:

a server configured to store the metadata associated with one or more electronic book data files and, in response to receipt of a payment from a user, to transmit a copy of the metadata to that user.

This invention also provides an electronic book distribution system comprising:

a server configured to store two or more electronic book data files and anthology data comprising an ordered list defining respective sections of the two or more electronic book data files that, together, form an electronic anthology book;

the server being configured, in response to receipt of a payment from a user, to extract the respective sections defined by the anthology data from the two or more electronic book data files, to concatenate the sections into a single electronic anthology data file, and to transmit a copy of the electronic anthology data file to that user.

This invention also provides an electronic book distribution system comprising:

a server configured to store one or more electronic book data files;

a book purchasing arrangement configured to communicate with the server to request the server to transfer an electronic copy of a book relating to that printed code to an electronic book reader device;

in which the server is configured to detect a manufacturer and/or supplier of the electronic book reader device associated with the purchase, and to provide a payment to that manufacturer and/or supplier in respect of the purchase.

This invention also provides a method of operation of an electronic book reader device, comprising:

sending, via a wireless network, reading position data defining: a current book data file being displayed by that electronic book reader device, and a current display position within that book data file;

receiving, via the wireless network, reading position data sent by another electronic book reader device; and displaying at least an indication of the current book data file and the current display position of the other electronic book reader device.

This invention also provides a data processing method in a system comprising a plurality of electronic book reader devices, each of the electronic book reader devices having a display and being connectable to a wireless network of electronic book reader devices, the method comprising:

a first electronic book reader device of the plurality sending, via the wireless network, reading position data defining: a current book data file being displayed by that electronic book reader device, and a current display position within that book data file; and at least a second, different, electronic book reader device of the plurality receiving, via the wireless network, the reading position data sent by the first electronic book reader device, and displaying at least an indication of the current book data file and the current display position of the first electronic book reader device.

This invention also provides an electronic book distribution method comprising:

distributing a printed code to a book purchaser;

a server storing one or more electronic book data files;

electronically reading a printed code relating to a book purchaser; and communicating with the server to request the server to transfer an electronic copy of a book relating to that printed code to an electronic book reader device associated with that book purchaser.

This invention also provides an electronic book distribution method comprising:

an electronic book reader device storing metadata associated with respective reading positions within an electronic book data file and displaying a representation of an item of metadata if the respective reading position of the electronic book data file is currently being displayed on the display; and a server storing the metadata associated with one or more electronic book data files and, in response to receipt of a payment from a user, to transmit a copy of the metadata to that user.

This invention also provides an electronic book distribution method comprising:

a server storing two or more electronic book data files and anthology data comprising an to ordered list defining respective sections of the two or more electronic book data files that, together, form an electronic anthology book;

in response to receipt of a payment from a user, the server extracting the respective sections defined by the anthology data from the two or more electronic book data files so as to concatenate the sections into a single electronic anthology data file; and the server transmitting a copy of the electronic anthology data file to that user.

This invention also provides an electronic book distribution method comprising:

a server storing one or more electronic book data files;

a book purchasing arrangement communicating with the server to request the server to transfer an electronic copy of a book relating to that printed code to an electronic book reader device;

the server detecting a manufacturer and/or supplier of the electronic book reader device associated with the purchase; and the server providing a payment to that manufacturer and/or supplier in respect of the purchase.

Further respective aspects and features of the invention are defined by the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 3 schematically illustrates a current reading position on an electronic book reader device;

FIG. 4 schematically illustrates a comment icon on an electronic book reader device;

FIG. 7 is a schematic flowchart illustrating the transfer of book file and current position data from one electronic book reader device to another;

FIG. 8 schematically illustrates one way of displaying current book file and current reading position data received from multiple other electronic book reader devices;

FIG. 9 schematically illustrates another way of displaying current book file and current reading position data received from multiple other electronic book reader devices;

DESCRIPTION OF THE PREFERRED EMBODIMENTS

Figure 1:
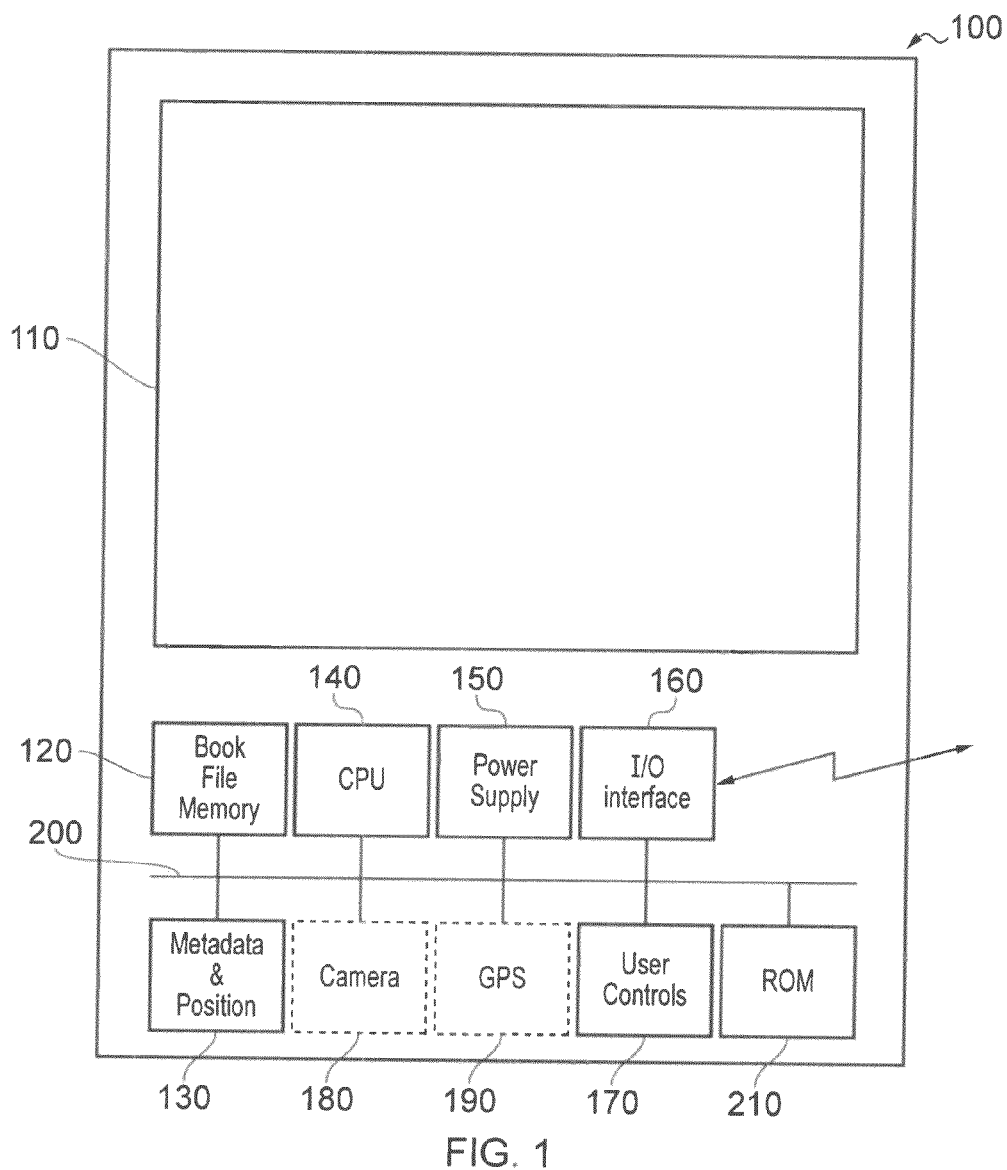
FIG. 1 is a schematic diagram of an electronic book reader device.

FIG. 1 is a schematic diagram of an electronic book ("e-book") reader device 100. The device 100 comprises a display screen 110 which may be a so-called "electronic paper" display screen of the type described above, a book file memory 120, a metadata and position memory 130, a central processing unit (CPU) 140, a power supply 150 which may be a rechargeable or dry cell battery, an input/output (I/O) interface 160 which can provide a wireless network interface (such as a so-called Wi-Fi interface and/or a mobile data network interface for example) and optionally a wired interface such as a universal serial bus (USB) interface, and user controls 170.

The user controls allow the user to select a current e-book from the book file memory, to advance through the pages of the selected book and to handle other menus associated with the operation of the e-book reader device 100. The user controls may be implemented as discrete buttons, as touch screen controls, or as a combination of these types of control.

Optionally, a camera 180 is provided, which may be implemented so that the camera field of view is from the rear side of the e-book reader device. Also optionally, a location detection device 190 (shown generically in FIG. 1 as a "GPS" (global positioning system) data receiver) may also be provided. The location detection device 190 may use various different location detection systems, examples being: the GPS system, the competing "Galileo" satellite navigation system, terrestrial navigation systems, location detection systems based on the identity of a WiFi "hotspot" (access point) with which the e-book reader device is currently in communication, or location detection systems based upon triangulation from mobile telephony base stations.

The various components of the e-book reader device are connected together by a bus 200.

In operation, the functions of the e-book reader device are controlled by the CPU 140, on the basis of computer software stored in a memory such as a read only memory (ROM) 210, also connected to the bus 200. The ROM 210 may be implemented as a non-volatile memory such as a so-called "flash" memory, and may be arranged so that the operating software of the e-book reader device 100 can be updated, under the control of the CPU 140, by replacement software received using the I/O interface 160. In other words, the ROM 210 may be "read only" in normal operation, but may allow its contents to be overwritten under special circumstances such as when an update of the operating software is provided.

The I/O interface 160 can act as a data transmitter, as a data receiver, or both, according to the current operation of the e-book reader 100.

Figure 2:
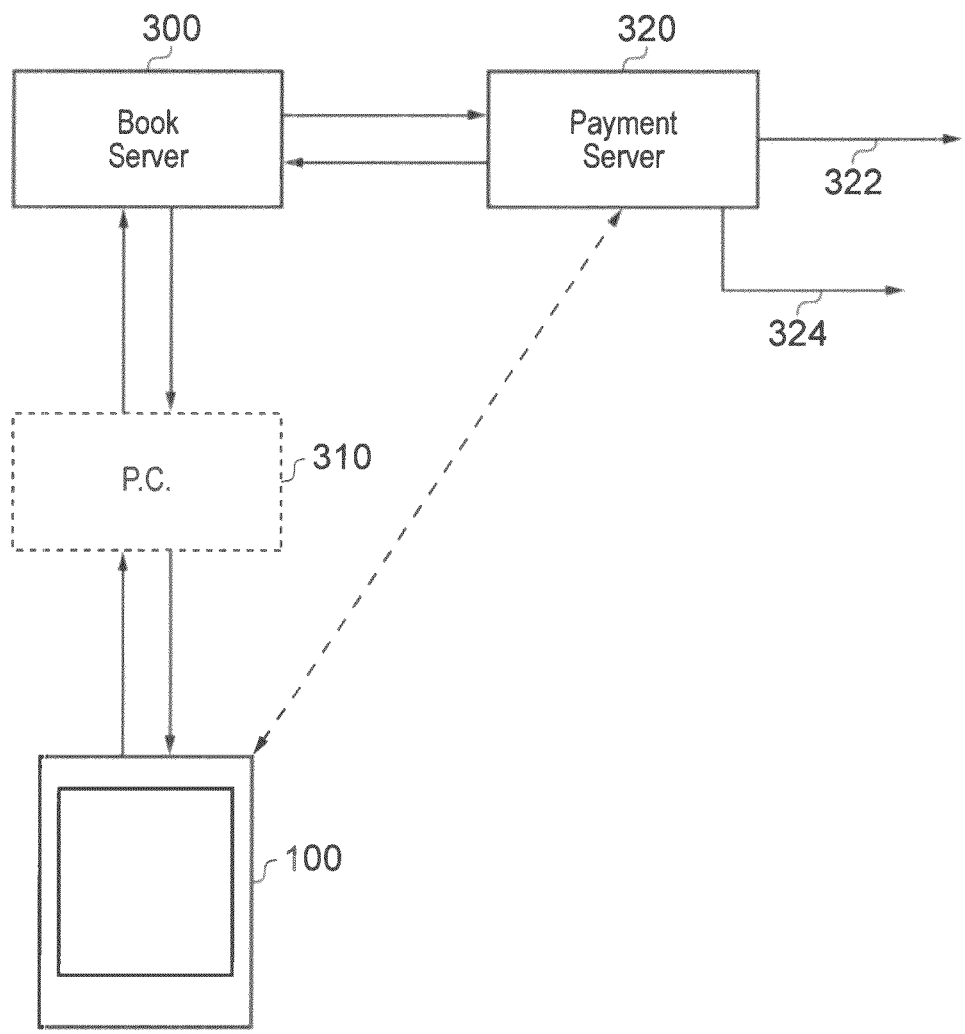
FIG. 2 schematically illustrates a transfer from an electronic book server to an electronic book reader device.

FIG. 2 schematically illustrates a transfer from a book server 300 to the e-book reader device 100.

This type of transfer is used generally to download e-book data files from the book server 300 to the e-book reader device 100. The term "download" indicates the general direction of the transfer, which is from the server to the e-book reader device 100. It will, of course, however be appreciated that any interaction of this type involves bidirectional data transfer in order to initiate and later to confirm the download of the book data file.

In order to implement this type of download operation, the e-book reader device 100 needs to form a data connection with the book server 300. Optionally, this can be via an intermediate computer such as a personal computer 310. In such an arrangement, the e-book reader device 100 forms a connection, either wirelessly or via (for example) a USB cable, to the personal computer 310, which in turn forms a network connection (for example, over an Internet connection) to the book server 300. Alternatively, the e-book reader device 100 can connect directly to the book server 300, without requiring the intermediate personal computer 310. Of course, in this context, a "direct" connection may still require routing via devices such as network hubs or switches (not shown), which serve to forward data packets forming part of the interaction between the book server 300 and the e-book reader device 100.

Some book servers 300 provide e-books which are free to the end user. In this type of arrangement, the data flow between the e-book reader device 100 and the book server 300 may follow the following pattern:

1. handshaking to establish a data connection between the e-book reader device 100 and the book server 300;
2. the e-book reader device 100 sending a request for a particular book data file (possibly after going through a selection process to choose that book data file from a menu of book data files available on that book server 300);
3. the book server 300 sending the requested book data file to the e-book reader device 100;
4. the e-book reader device 100 storing the received book data file in the book file memory 120;
5. the e-book reader device 100 acknowledging receipt of the received book data file to the book server 300; and
6. handshaking to close the data connection between the e-book reader device 100 and the book server 300.

However, some book servers require payment for downloaded e-books. Indeed, this is the normal mode of operation for book servers which provide book data files relating to works which are still within their copyright period. In the schematic arrangement of FIG. 2, this is achieved by the book server 300 interacting with a payment server 320, between the steps 2 and 3 in the list identified above.

There are several conventional ways for payment to be taken in respect of a networked download purchase of this type. For example, the e-book reader device 100 may be associated with a user account, so that the e-book reader device 100 can send secret data identifying that user account to the book server and thus to the payment server, which authorises the payment server to debit the cost of the current purchase from the user's credit card. In an alternative, the user can enter payment details, such as credit card details, in respect of each current purchase, with those details being used by the payment server 320 to debit the cost to the user's credit card. For security, the exchange of user accounts data and/or credit card data may be achieved by an encrypted connection directly between the e-book reader device 100 and the payment server 320 (as shown in broken line on FIG. 2).

At the end of the payment process, the payment server 320 can send a confirmation to the book server 300 that the payment has been successfully made. The book server 300 responds by providing the requested book data file as a download to the e-book reader device 100 (the step 3 in the list identified above).

FIG. 3 schematically illustrates a current reading position on an e-book reader device. The view of the device in FIG. 3 is a schematic representation of the exterior of the device (in contrast to the schematic internal diagram of FIG. 1), so for the purposes of the present description only the exterior view of the display screen 110, control buttons 330 (representing the user controls 170) and an exterior casing 340 are illustrated.

The e-book reader device 100 is shown displaying part of an e-book on the display screen 110. As mentioned above, to achieve this, the CPU 140 reads a relevant part of the appropriate book data file from the book file memory 120 and formats it for display according to the display resolution and font size appropriate to the display screen 110. The formatting process makes use of a notional page size, which is to say, the number of words and/or lines of text which can be fitted onto a single page is displayed on the display screen 110. The user may advance to a next "page", which is to say, the next group of lines which will fit on the display screen 110 and which are contiguous to the currently displayed group of lines, by pressing a page advance button 332. The user may display a preceding page by pressing a preceding page button 334. It will be understood that other user controls may be provided to allow the user to control other functions of the e-book reader device, but that these user controls are not shown in FIG. 3 for clarity of the diagram.

The CPU 140 stores the current "page", that is to say, data defining or pointing to the set of lines displayed on the display screen 110, in the metadata and position memory 130. This data may be stored in various different forms, but a convenient notation is to store the location, within the overall book data file, of the first and last words currently displayed on the display screen 110.

The user can also control a cursor 350 which can be moved around within the currently displayed page on the display screen 110. Separate cursor controls can be provided to achieve this, (as part of the generic user controls 170) or the display screen 110 may be a touch-sensitive screen so that the user can indicate a current cursor position to the CPU 140 by touching the display screen 110 at the required position. Again, the cursor position is stored by the CPU 140 in the metadata and position memory 130.

FIG. 4 is similar to FIG. 3, but also illustrates a so-called "comment icon" 360 within a displayed page of text. Note that the page of text shown in FIG. 4 is the page following that shown in FIG. 3, indicating that the user has pressed the page advance button 332 in order to change the displayed text to the next-following page.

The comment icon 360 indicates that a comment is available to be read at that position within the text of the current book. So, the comment icons are associated with text positions. This means that the comment icon 360 was not displayed when the previous page of text was shown on the display screen, as illustrated in FIG. 3, but when the page was advanced to the next page as shown in FIG. 4, the comment icon 360 (being associated with a text position as displayed in FIG. 4) was displayed.

In general, the display of a comment icon 360 does not interrupt the display of text on the display screen 110. So, the user can continue to read the book and ignore the comment icon 360. If the comment icon 360 is positioned so as to be displayed within a line of text (rather than at the end of a line as shown in FIG. 4) then the displayed text can be "reflowed", which is to say, formatted to fit around the display of the comment icon 360 so that no words of the book are obscured by the comment icon 360.

If the user wishes to select a comment icon, in order to "open" the comment (that is to say, display the full text of the comment associated with the comment icon) then the user can simply move the cursor 352 the position of the comment icon 360 under consideration. Optionally, the user can press a certain control forming part of the user controls 170 once the cursor is in position. Alternatively, in a touch-screen system, the user may simply touch the screen at the display position of the comment icon 360 under consideration.

When the user does open a comment, a "comments box" is displayed. An example of such a display is illustrated schematically in FIG. 5, in which a comments box 370 overlies the display of the relevant text of a current book.

When a comments box is displayed, the comment icon 360 is also displayed so as to provide a means for the user to close the current comments box and return to reading the text of the book. Note that if the user presses either the page advance key 332 or the previous page key 334 so as to move to a different page of the current book, the currently displayed comments box will also close.

Figure 5:
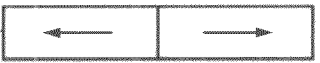
FIG. 5 schematically illustrates a comments box on an electronic book reader device.

Several comments are displayed in the example comments box shown in FIG. 5. The comments are associated with their respective author and the time at which the comments were made. In general terms, a user may enter a comment by moving to the appropriate position in the book text and operating a user control 170 to indicate that the user wishes to start writing a comment. The user then composes the comment using a physical keyboard (if one is provided as part of the user controls 170) or a touch screen text entry system such as a virtual keyboard.

If the comment which the user is writing is the first comment in respect of a particular text position, that comment will be stored and a comment icon 360 will be displayed at that text position. The comment and its location in the text are stored in the metadata and position store 130. If, however, the comment which the user is writing is subsequent to an earlier comment in respect of that text position, a new comment icon 360 is not generated but instead the newly-entered comment is added to previous comments in the comment box 370, for example in order of the time of comment entry.

Comments made by users are shared with other users who are reading the same book data file. When a comment is entered, the CPU 140 causes the comment text to be stored in the metadata and position store 130 in association with a particular text position within the current book data file, and also causes the comment to be transmitted via the interface 160 to other e-book reader devices which are networked with the current e-book reader device, possibly being coordinated by storage of the comments in a metadata store at the book server 300. The comments are transmitted with an associated username, being the name of the user corresponding to the e-book reader device on which the comment was entered. In this way, the type of comments shown in the comments box 370 of FIG. 5, in which each comment is associated with a time and a user identity, can be displayed. Optionally, user identities can be associated with so-called "thumbnail" pictures chosen by the respective users or associated with entries in a list of friends maintained by the user of the current e-book reader device. Also, as shown in FIG. 5, the username of the user of the particular e-book reader device on which the comments box 370 is currently displayed can be substituted for the word "me".

It is possible to sell a set of comments in its own right. In one possible arrangement, a user can generate a set of comments in respect of a particular e-book but, in order to maintain the value for possible future sale, may inhibit the distribution of those comments to other users by the network described above. Instead, the comments can be collated into a metadata file which can itself be made available for sale at the book server 300 of FIG. 2.

With regards to FIG. 2, a purchasing user can order a metadata file in a similar way to ordering and paying for a conventional e-book file. The metadata file is downloaded to the ordering user's e-book reader device 100 and stored in the metadata and position store 130 of that device. If the corresponding e-book data file is also stored on that e-book reader device (in the book file memory 120) then the CPU 140 will associate the comments contained in the metadata file with that e-book data file when the e-book is read by the user.

More than one user can cooperate to generate comments as metadata for subsequent sale. This requires the users to establish a closed group within which comments on a particular e-book are shared, but outside of which the comments are not shared over the network. In this instance, once the metadata file containing the aggregated comments of the closed group of users is provided to the book server for sale, the payment server 320 can provide payment 322 to each of the contributing users in proportion to the length and/or number of their respective comments forming part of that metadata file. A further share 324 of the revenue generated by the payment server 320 can be provided to other entities such as the e-book reader device manufacturer and/or supplier. Ways in which this revenue share 324 can be provided will be discussed in greater detail below.

Figure 6:
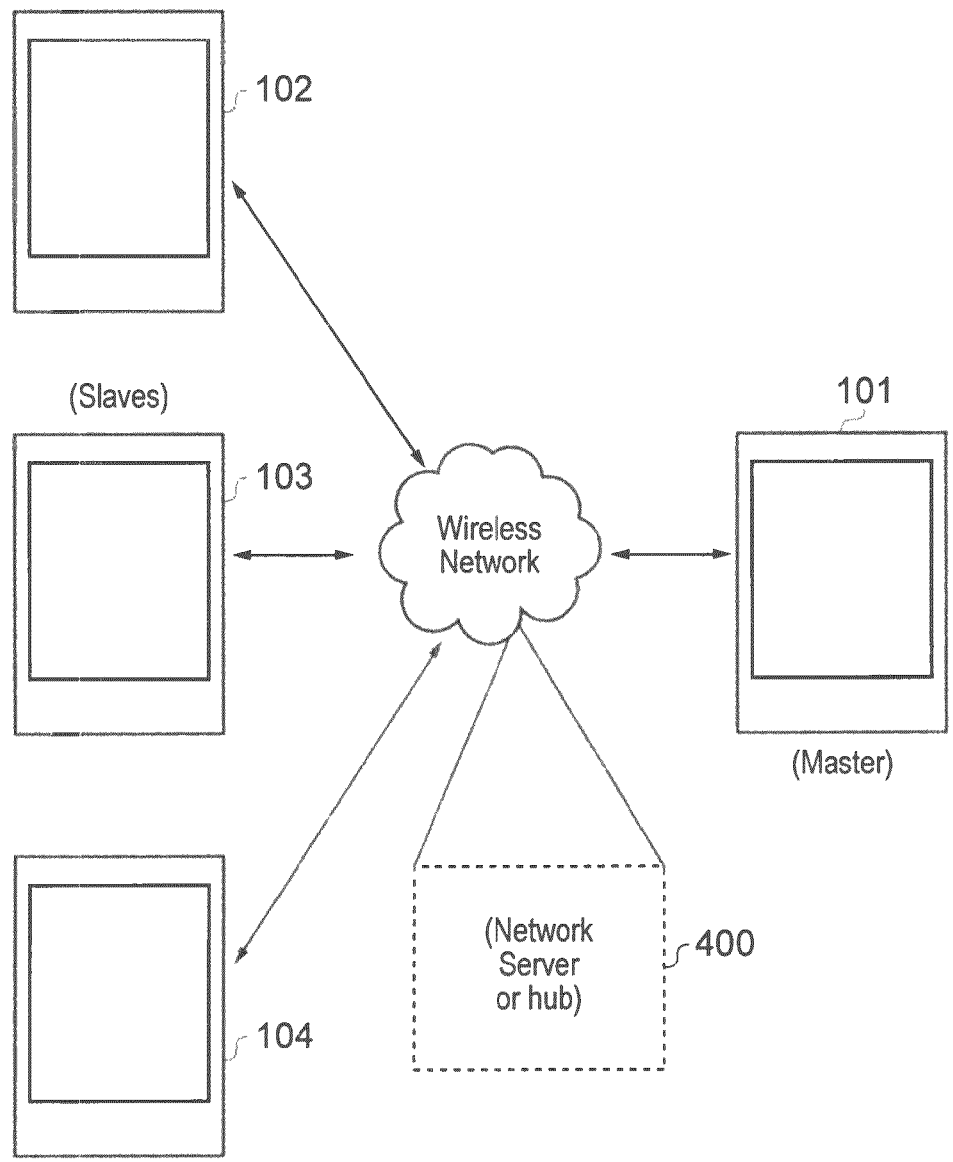
FIG. 6 schematically illustrates a data processing system comprising a plurality of electronic book reader devices.

FIG. 6 schematically illustrates a data processing system comprising e-book reader devices 101, 102, 103, 104 . . . . Each of the e-book reader devices shown in FIG. 6 is similar in form to the device 100 described above.

The plurality of e-book reader devices, each having a display 110, connect to one another by the wireless connection formed by their respective interface 160. This connection can be made via an optional central point 400, such as a network server or a Wi-Fi hub. Alternatively, the e-book reader devices can connect directly to one another as a so-called ad hoc network. In a further alternative, one of the e-book reader devices, for example the first such device to initiate a connection as part of the wireless network shown in FIG. 6, can act as a hub for the connection of the other devices. In a further alternative, which relates to a possible "master-slave" system to be described below, a device designated as a "master" device can act as a hub for the connection of the other devices.

In some embodiments of the invention, all of the plurality of e-book reader devices in the data processing system of FIG. 6 have equal status. That is to say, none of the devices is either a "master" or a "slave" with respect to the others. In other embodiments of the invention, one of the devices (in the example of FIG. 6, the device 101) is designated as a "master" device and the others are designated as "slave" devices. The reason for this designation will be described below.

First, arrangements in which all of the devices in the data processing system of FIG. 6 have equal status will be described. This type of arrangement allows a "community" type of data sharing to take place, by which data from any one of the plurality of devices forming the data processing system of FIG. 6 is provided to all of the other devices in the data processing system. In embodiments of the invention, this takes place between all of the devices in the system, so that each device shares its own data and also receives incoming data, as available, from each other device.

One example of the type of data which can be shared in this way is comment data as described above. So, a comment added at any of the devices in the data processing system is propagated to all other devices in the data processing system. Comments are displayed on each of the e-book reader devices: firstly in the form of a comment icon at the appropriate text position in the relevant book data file (if indeed that book data file is currently being read at an e-book reader device) and then, if the user opens the comment icon, as an ordered list in a comments box of the form shown schematically in FIG. 5.

Another example of the type of data which can be shared in this way is book file and position data. FIG. 7 is a schematic flowchart illustrating the transfer of current book file and current position data from one e-book reader device to another.

Referring to FIG. 7, processes carried out by a "transmitting" e-book reader device are shown to the left of the diagram, and processes carried out by a "receiving" e-book reader device (of which there may be several in the data processing system of FIG. 6) are shown to the right of the diagram. A vertical broken line separates the two parts of the diagram.

At a step 450, the transmitting device establishes its current book data file and current position. As described above, the user is responsible for selecting a current book data file to be read and for selecting a current position within that book data file, by using the user controls 170 in conjunction with the display 110. The CPU 140 causes data defining the current book data file and the current position to be stored in the metadata and position store 130. So, the schematic step 450 may be regarded as the CPU storing such data in the metadata and position store 130 and/or reading such data from the metadata and position store 130.

At a step 460, the transmitting device transmits data defining the user of the device, the current book data file and the current position within that book data file, via the wireless connection established by the interface 160, to other devices in the data processing system of FIG. 6. Such other devices would be referred to as "receiving" devices for the purposes of this particular data transaction. It will of course be understood that any individual e-book reader device may be regarded as a "transmitting" device and a "receiving" device at the same time, in respect of different data transactions.

At a step 470, the receiving device receives the data transmitted by the transmitting device. The CPU 140 of the receiving device may process the received data so as to aggregate it with corresponding data received from other devices in the data processing system of FIG. 6, and store the results, for example in a reserved section of the metadata and position store 130.

Finally, at a step 480, the receiving device displays information derived from the data received from the transmitting device. (Note that the step 480 can be different in a master-slave arrangement which will be described separately below).

In a community data sharing arrangement of the type being described, any individual receiving device may receive data from a large number of transmitting devices in the data processing system shown schematically in FIG. 6, either directly or via a WiFi hub, network server or a data-transfer-coordinating book server as discussed above. In order to aggregate and display the received information in a convenient way, two example alternatives will now be described with reference to FIGS. 8 and 9.

Referring to FIG. 8, the aggregated book file and position data received from other e-book reader devices can be displayed as a series of histograms 500 arranged by book title. In an example arrangement, the histogram for each book title indicates the number of users at each of a succession of ranges of position within that book. This can indicate the total number of users reading that book, although the total number can also be given in a separate box 510, and the distribution of reading positions currently occupied by the users who are reading that book. Looking at the example histograms 500 shown in FIG. 8, the most common current position for readers of "The Importance of Being Earnest" is around the middle of the book. In contrast, readers of "The Time Traveller" are generally distributed around the start of the book.

FIG. 9 gives an alternative schematic arrangement, in the form of a list of users, book is titles and page numbers (or positions within the book).

Another example of community-based data sharing is to share physical location data. This will be described, in the context of the establishment of a so-called book club, with reference to FIGS. 15-21 below.

Returning to FIG. 7, the situation relating to a master-slave system will now be described.

It was mentioned above that one of the e-book reader devices in the data processing system of FIG. 6 can be designated as a master device. This designation would be by mutual agreement of the e-book reader devices forming part of the data processing system of FIG. 6, that is to say, each user would have to agree to the temporary designation of a particular device as the master.

One reason why a master-slave arrangement could be very useful is in the context of classroom instruction or a lecture. In such a situation, the teacher or lecturer could be designated as the user of a master device in such a master-slave arrangement, for example to indicate a line position within a currently displayed page, that line position then being displayed at each of the slave devices.

In a master-slave arrangement of this type, the step 480 of FIG. 7, and its effect upon the operation of the slave devices, is different to that already described.

In particular, at the step 480, the book file and position data received from the master device 101 is used to set the book file and position to be used by each of the slave devices 102, 103, 104. So, if the user of the master device 101 turns a page on his device, this causes a change to the position data established at the master device at the step 450, with that change being propagated to the salve devices by being transmitted to the slave devices at the step 460. Each slave device receives the changed position data at the step 470 and passes control to the step 480 which causes the currently displayed page on each slave device to be changed so as to match the currently displayed page on the master device. In terms of the internal operation of a slave device, at the step 470 the book file and position data from the master device is received by the interface 160 and, under the control of the CPU 140 is written to the metadata and position store 130 so as to overwrite the current book file and position data held by the slave device. The CPU 140, referring to the book file and position data, causes the display 110 to display the appropriate page specified by that stored book file and position data.

The designation of the master device can be rescinded by any individual slave device at any time. This is done by the user of that slave device operating a user control 170 to indicate that the user no longer wishes his device to be a slave device to that particular master device. So, the acceptance of "slave" status for a device is voluntary, being at the discretion of the user of the potential slave device. Similarly, the master device can itself withdraw from being a master device at any time.

The arrangements of FIGS. 8 and 9, or the display at a slave device of the current book file and reading position of the master, for various examples of different ways of displaying at least an indication of the current book data file and the current display position at another e-book reader device.

Figure 10:
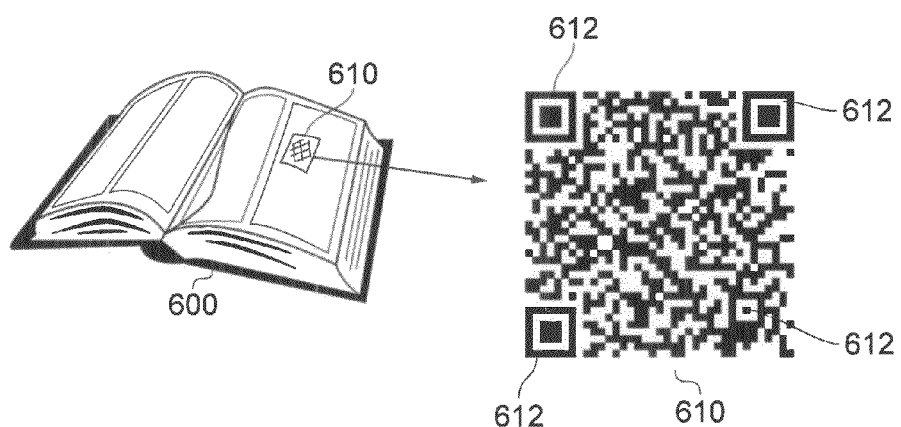
FIG. 10 schematically illustrates an electronically readable printed code within a printed book.

FIG. 10 schematically illustrates an electronically readable printed code 610 within a printed book 600.

Generally speaking, the conventional purchase of a printed book by a user does not normally entitle that user to receive a downloaded electronic copy of the same book. The arrangement shown in FIG. 10 can provide such an arrangement, and/or can provide other advantageous features.

The example printed code shown in FIG. 10 is an electronically readable barcode of the type commonly referred to as a "QR" (quick response) code. QR codes follow an established format so as to be readable by barcode readers and also by electronic devices having a built-in camera. The QR code 610 carries alignment marks 612 and a pattern of other markings by which various data can be encoded.

In one example arrangement, a QR code 610 can be printed within the body of the book 600, or for example on an end cover of the book 600, or as an inserted detached slip of paper within the book 600 when the book is prepared for sale, or on the sale receipt provided when the paper book is purchased.

Figure 11:
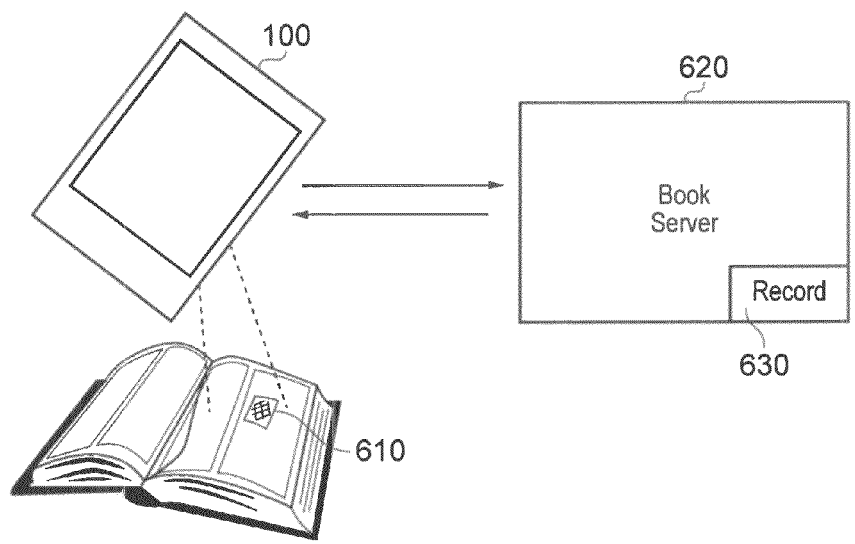
FIG. 11 schematically illustrates the reading of an electronically readable printed code from a printed book by an electronic book reader device.

FIG. 11 schematically illustrates the reading of such an electronically readable printed code from a printed book by an e-book reader device. Here, the e-book reader device is of the type shown in FIG. 1, including the optional camera 180. The camera 180 is used to capture an image of the QR code 610. The QR code 610 can be decoded (that is to say, the data encoded within the QR code 610 can be extracted) by the CPU 140 of the device 100 operating under the control of software stored in the ROM 210. Alternatively, the image captured of the QR code 610 can be sent to a separate server (such as a book server 620) for decoding.

In either case, the user may operate user controls to cause the e-book reader device 100 to transmit data relating to the QR code 610 to the book server 620.

In embodiments of the invention, the QR codes 610 are unique with respect to one another. That is to say, any one instance of a QR code 610 in connection with a printed book 600 carries a different code to any other instance of the QR code 610. In general terms, the QR code 610 carries some information which uniquely defines the title and content of the book 600, for example a representation of the ISBN (International standard book number) of the book, in conjunction with a unique or quasi-unique number representative of the particular instance of that QR code 610, that is, distinct from other instances of the QR code 610.

When the data derived from the QR code 610 is sent to the book server 620, the book server carries out a decoding step if required, and then compares the data represented by the QR code 610 with a list of "already used" QR codes stored as a record 630 within the book server 620. In other words, the book server 620 records the usage of each instance of the printed code and, in some embodiments of the invention, can inhibit more than one usage of a particular instance of the code. If the data represented by the current QR codes 610 is not found in the record 630, this indicates that this is the first time of attempted use of the particular QR code 610. As mentioned above, the QR code 610 contains data which indicates the particular book 600 under consideration, so in response to a detection that this is the first time of attempted use of this particular QR code 610, the book server 620 is arranged to transmit an electronic copy of the same book to the e-book reader device 100 which captured the image of the QR code 610.

The book server stores data derived from the particular QR code 610 in the record 630. This allows the book server to refuse any further requests for downloads of that book in respect of subsequent attempted users of that particular already-used QR code 610.

Figure 12:
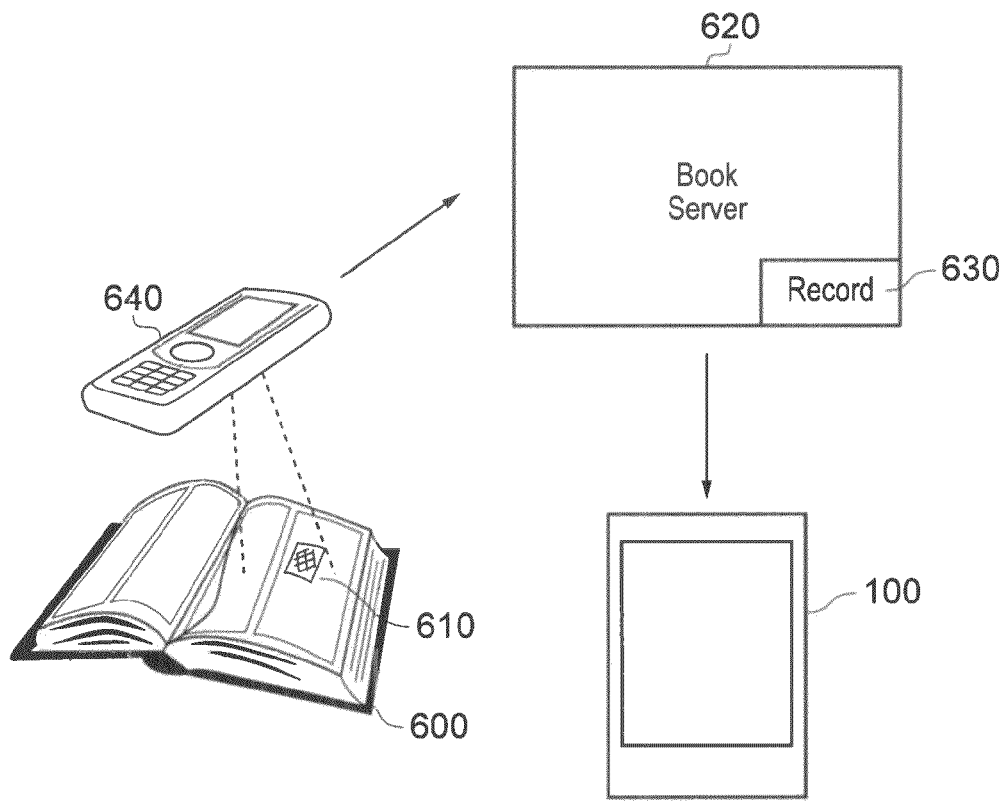
FIG. 12 schematically illustrates the reading of an electronically readable printed code from a printed book by a device other than an electronic book reader device.

FIG. 12 schematically illustrates the reading of an electronically readable printed code from a printed book by a device other than an e-book reader device. Here, the reading of the QR code 610 is carried out by a mobile phone or smart phone 640, although other devices such as a laptop computer with an associated webcam or a point of sale terminal could be used in place of the mobile phone 640.

The mobile phone 640 captures an image of the QR code 610 and decodes the data encoded by the QR code. The mobile phone 640 transmits the decoded data to the book server 620, along with an identification of the particular e-book reader device to which the corresponding book data file should be transmitted. As before, the book server 620 compares the data derived from the QR code 610 with data relating to previously-used QR codes stored in the record 630. Assuming that this is the first attempted use of the particular QR code 610, the book server 620 provides the e-book data file relating to the book 600 to the appropriate e-book reader device 100.

A financial commission on the transaction can be provided as a revenue share (as shown as 324 in FIG. 2) to the manufacturer and/or retailer of the e-book 100 which receives the downloaded copy.

The identification of the appropriate e-book reader device 100 can be via, for example, a user name. The e-book reader device 100 registered to that user name does not have to be connected to the book server 620 at the time that the mobile phone 640 transmits the data relating to the QR code 610; instead, the book server 620 could allocate a copy of that particular book data file for downloading by the e-book reader device 100 when the e-book reader device 100 next makes a data connection to the book server 620.

As well as determining the correct destination to which the e-book should be downloaded, the revenue sharing arrangement mentioned above needs to know which manufacturer and/or retailer provided that e-book reader device. This is achieved in embodiments of the invention by the book server 620 sending a message to the e-book reader device (which has been identified by, for example, its user account) to query the contents of a particular storage area of, for example, the ROM 210, which contains a device identifier. The device identifier can include a unique or quasi-unique device code which can be matched, by the book server 620, to a list of device codes and their respective suppliers and/or manufacturers. Or the device identifier can include a manufacturer code and/or a supplier code which directly provide the required information to the book server 620 to allow the revenue share to be allocated correctly. Of course, the device identifier can include both of these types of information, and optionally further information as well.

It is not a requirement that the printed code is machine-readable, nor that the particular example format of a QR code is used. Other machine-readable codes such as linear barcodes could be used, or human-readable codes could be employed. If a human-readable code (such as a long sequence of numbers in which the identity of the book and the unique part of the code are encoded or hashed) then the user could type such a number into a data entry screen on his e-book reader device 100 or other device such as the mobile phone 640. Alternatively, even though the code is human-readable, the camera arrangement described with relation to FIGS. 11 and 12 could be used to capture an image of the code which is then subjected to optical character recognition by the e-book reader device 100, the mobile phone 640 and/or the book server 620.

In the arrangements just described, the printed code itself (or at least, the fact that this is the first usage of that printed code) indirectly provides information to the book server that payment has been made for the book download. In the arrangements to be described below, explicit payment information is provided to the book server 620.

Figure 13:
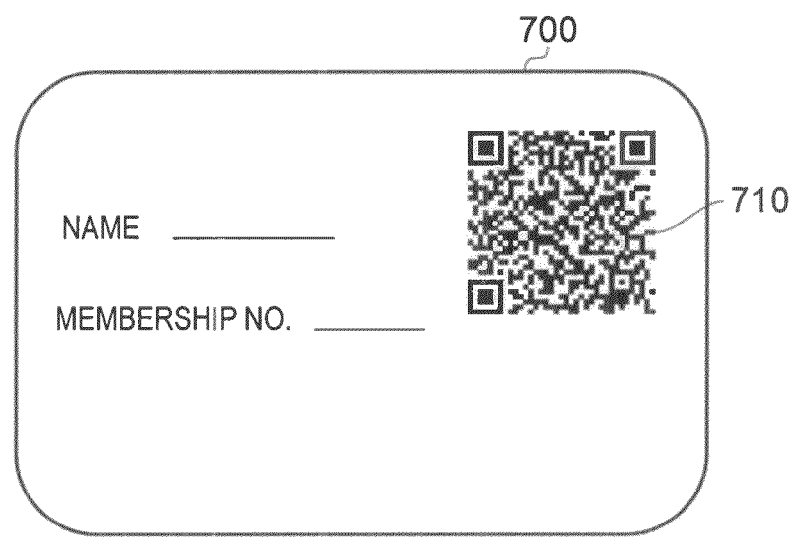
FIG. 13 schematically illustrates a user identification card.

Another use of printed codes is to provide a user identification, for example in the form of a user identification card shown schematically in FIG. 13. This could be, for example, a loyalty or membership card associated with a physical book store.

The card 700 shown in FIG. 13 could be, for example, of a similar size to a standard credit card, and carries a user's name, optionally a membership number, and a machine-readable code 710 unique to that user. Here, the code 710 is shown by way of example as a QR code, and carries data representing the organisation which provided the card (such as the physical bookstore) along with unique or quasi-unique data defining that particular user.

An example of the use of such a card will now be described with reference to FIG. 14, which schematically illustrates the reading of such a user identification card 700 at a point of sale (POS) terminal 720.

Figure 14:
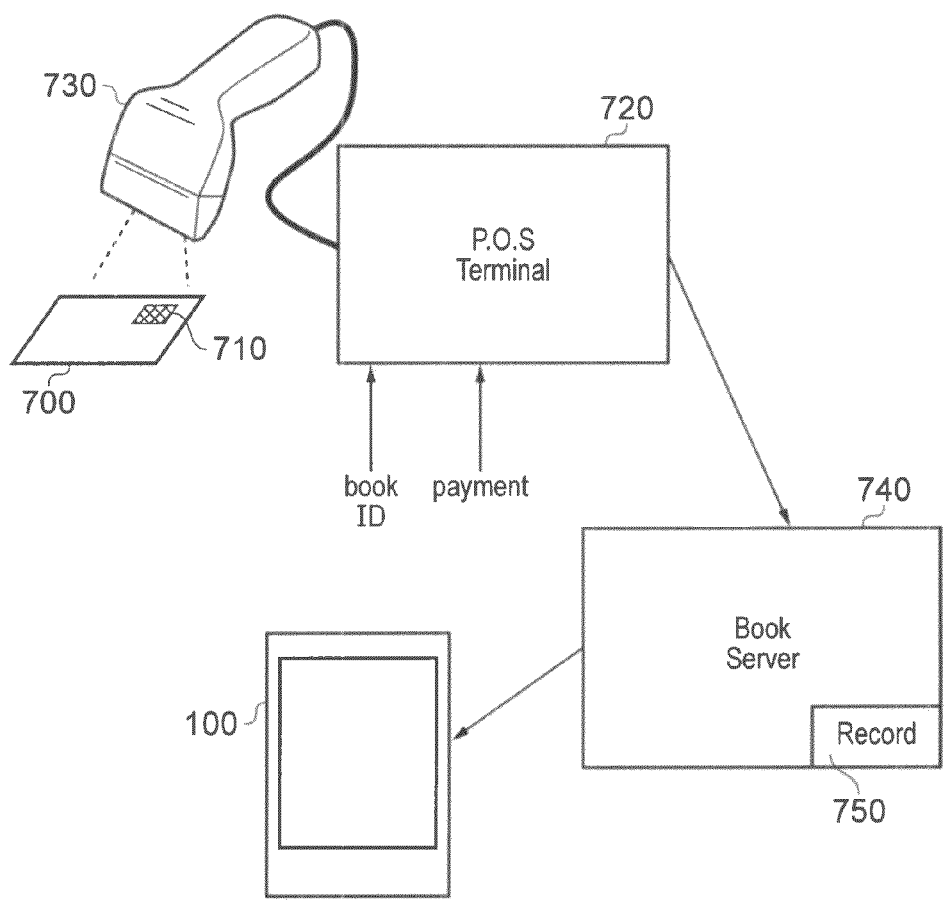
FIG. 14 schematically illustrates the reading of a user identification card at a point of sale terminal.

Referring to FIG. 14, a hand-held scanner 730 captures an image of the QR code 710 on a particular user's membership card. The user's identification as derived from the membership card is passed to the POS terminal 720.

As part of the same transaction, the user provides payment at the POS terminal 720 and also provides the identification of a particular book. For example, the user may be purchasing a paper copy of a particular book, whereby the current arrangement allows the user to receive an electronic copy of the same book. So, the identification of the particular book in this context would be the book that the user is buying as part of the current transaction. In an alternative arrangement, the user may have browsed the physical bookshelves for a particular book and carries the book to the POS terminal 720. However, instead of receiving the physical book to take away, the present arrangement allows the user to receive an electronic copy of the corresponding book data file.

The POS terminal 720 transmits data to a book server 740 defining the particular book under consideration and the identity of the user who has made the purchase. The POS terminal 720 may also transmit a confirmation that the requisite payment has been made.

The book server 740 may maintain a record 750 similar to the record 630 discussed above, of book downloads which have previously been allowed in respect of individual user identities. Such a record may be used to prevent subsequent downloads of the same book to different e-book reader devices, so as to avoid the situation whereby a single purchase is used to obtain multiple copies of the purchased e-book data file.

The book server 740 may maintain a list of identifiers of individual e-book reader devices 100 registered to user identities, to allow the book server to transmit the purchased e-book data file to the correct e-book reader device. Alternatively, the data encoded within the QR code 710 can itself provide routing details to allow the book server 740 to send the purchased e-book data file to the correct e-book reader device 100.

A revenue share can be routed to the e-book reader device manufacturer and/or supplier using the techniques described above.

As described above, the e-book reader device 100 may include a location detector 190. Also as mentioned above, the data shared between devices in the data processing system of FIG. 6 can include physical location data. Techniques by which such data can be shared, and possible uses of the shared data including the display of an indication of the physical location of another device as defined by received location data, will now be described with reference to FIGS. 15-21. Once again, this can take place on a master-slave basis or on a community basis, as described above.

The starting point for the present part of the description is that the location detector 190 is arranged to detect the physical location of the e-book reader device 100. Depending upon the exact nature of the detection system in use, the accuracy of such a detection may vary between a few meters or less and a few hundred meters, but in general this range of accuracy is not technically relevant to the embodiments to be described.

Figure 15:
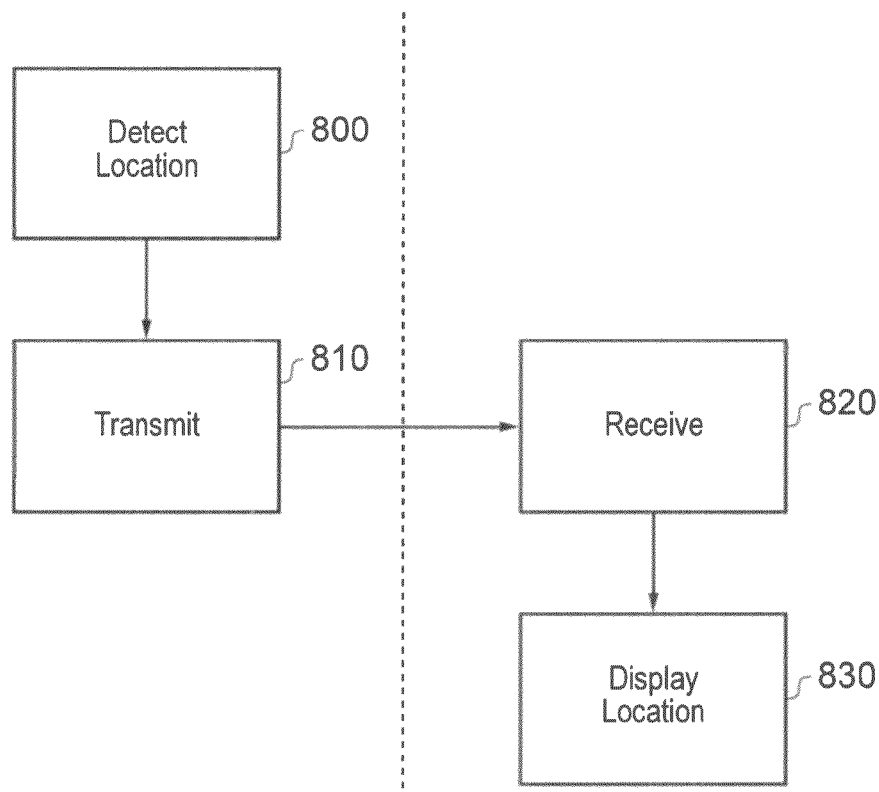
FIG. 15 schematically illustrates the transfer of physical location data from one electronic book reader device to another.

Referring to FIG. 15, at a step 800 the location of an e-book reader device 100 is detected. In particular, the location detector 190 generates location data indicative of the physical location of the device 100. The location data may be, for example, a map or grid reference representing the current physical location. The CPU 140 causes this data to be formatted and sent to the interface 160 which, at a step 810 in FIG. 15, transmits the physical location data to one or more receiving devices in the data processing system of FIG. 6 by a wireless connection.

Turning now to the steps carried out by a receiving device of the data processing system of FIG. 6, at a step 820 the receiving device receives the physical location data transmitted by the transmitting device. This is achieved by the interface 160 of the receiving device receiving a wireless signal containing the location data. Then, at a step 830, the receiving device is operable to display the location of the transmitting device, as indicated by the location data received from that transmitting device. Techniques by which the location can be displayed will be described below.

Figure 16:
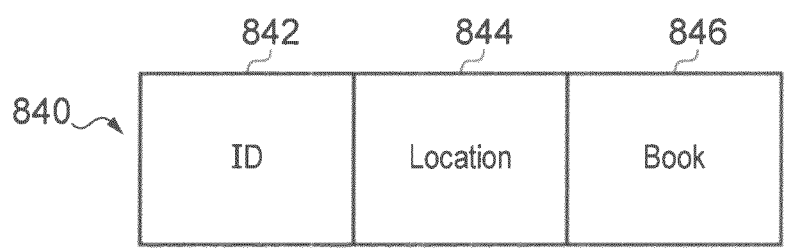
FIG. 16 schematically illustrates an example format of physical location data.

FIG. 16 schematically illustrates an example format of physical location data is transmitted by a transmitting device. The physical location data comprises a data packet 840 having a user or originating device identifier 842, the actual location data 844 defining the location of the originating device as detected by the location detector 190 at or just before the time at which the packet was prepared, and a book identifier 846 defining a current book data file being read at the originating e-book reader device. Optionally the book identifier can also (or instead) define a list of one or more books (and/or a profiled defining one or more categories of books) in which that user has expressed an interest, and/or has already read, and/or has downloaded.

Figure 17:
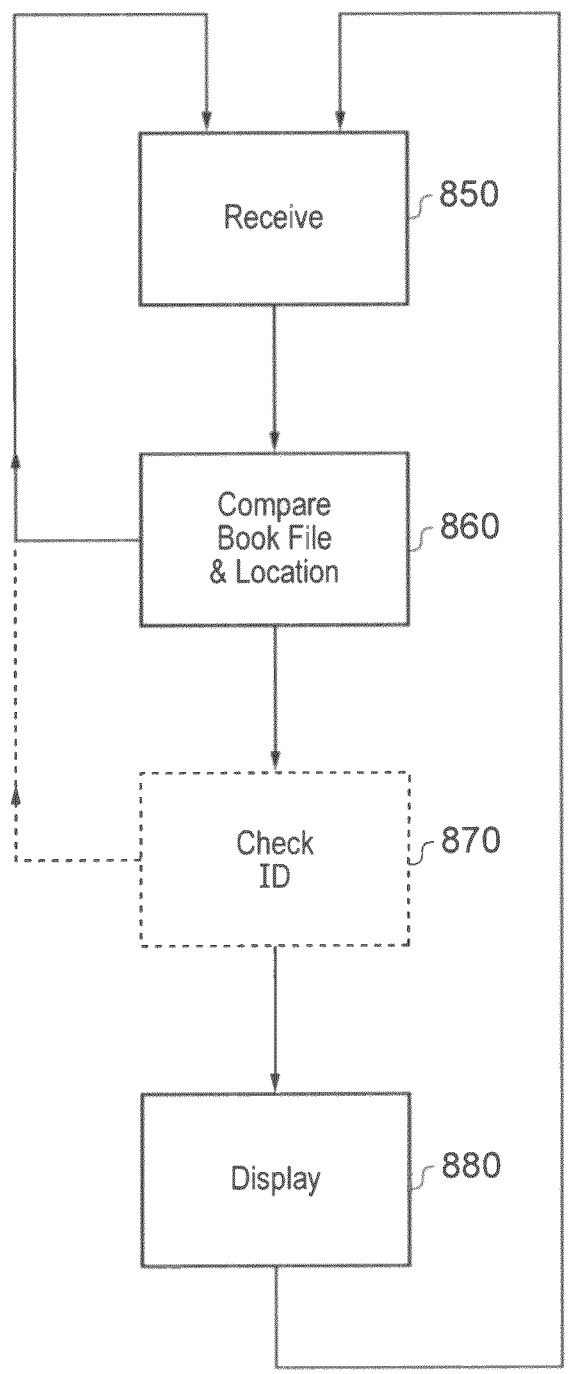
FIG. 17 schematically illustrates a process carried out at a receiving electronic book reader device.

FIGS. 17 schematically illustrates a process carried out at a receiving e-book reader device.

At a step 850, the device receives the data packet 840 of FIG. 16. In particular, the interface 160 of the receiving device 100 receives a wireless signal by which the data packet is transmitted, and passes the received data packet 842 the CPU 140 to be processed.

At a step 860, the CPU 140 of the receiving device 100 checks the book identifier 846 of the received packet 840 to detect whether the received book data represents either (a) the to same book as the user is currently reading at the receiving device 100, or (b) a book in which the user has expressed an interest, for example by having read the book, having downloaded but not yet read the book or having placed the book on a so-called "wish list" of desirable books. The comparison of "interest" under (b) could be made on the basis of a comparison of genre, author, publisher or the like. For example, a user could establish a personal "profile" defining genres, publishers, authors and the like in which the user is interested. The profile could be stored on the user's device, and/or propagated to a selection of other users' devices, and/or stored on a server which could be, for example, a social networking server. If the book specified by the book identifier 846 is in neither category (a) or (b), then the data packet 840 as received is discarded and control returns to the step 850.

Optionally, the receiving device also compares, at a step 860, the location of the transmitting device as specified within the data packet 840 with the current location of the receiving device. If the location of the transmitting device is further from the location of the receiving device than a threshold distance (which can be set by the user, but an example might be 60 miles) then the received data packet 840 is discarded and control returns to the step 850.

Optionally again, at a step 870, the identifier specified by the identifier data 842 in the packet 840 is checked by the receiving device. The user of the receiving device can maintain a list of "friends", that is to say, identifiers about which the user is interested in receiving information. If the received identifier 842 does not fall within the list of friends, then either the system prompts the user to ask whether a newly received identifier should be added to the list of friends, or the currently received packet 840 is discarded and control returns to the step 850.

For any packets which have not been discarded by the steps 860 and 870, the location data is displayed at a step 880. Formats for this display will be discussed below.

Figure 18:
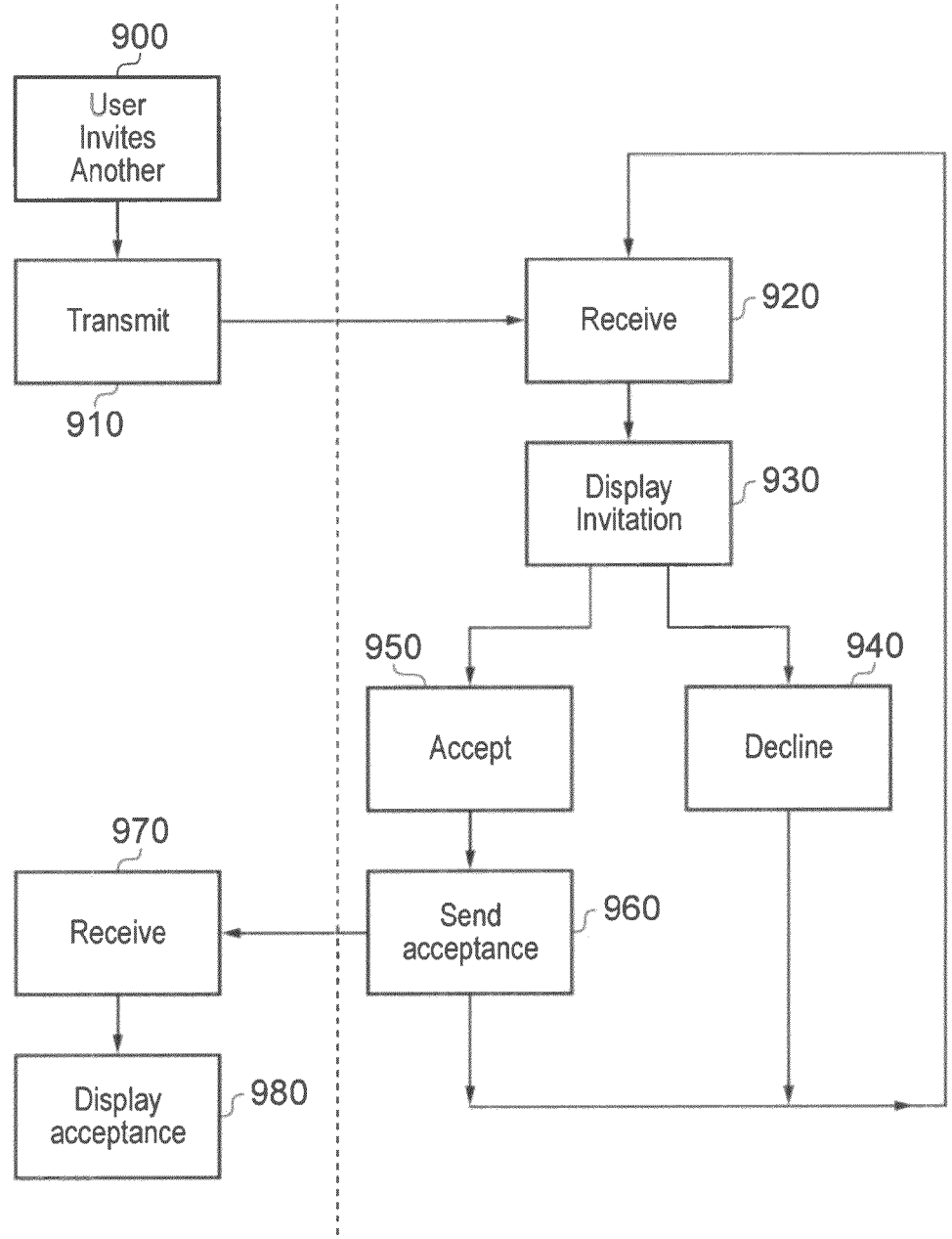
FIG. 18 schematically illustrates steps carried out by a pair of electronic book reader devices in respect of an invitation to join a book club.

One use of the location data is simply to find out where other users who are reading either the same book as the user of the receiving device or a book in which that user is interested are located. Another possible use is to allow a so-called book club to be formed as a group of users interested in the same types of book. FIG. 18 schematically illustrates steps carried out by a pair of e-book reader devices in respect of an invitation to join a book club. As before, in FIG. 18, operations carried out by one of the pair of devices (the device which transmits the meeting invitation) are shown to the left of a broken line, and operations carried out by the other of the pair of devices (the device which receives the invitation) are shown to the right of the broken line. The operations can be arranged so as only to be allowable with respect to devices separated by no more than the threshold distance mentioned above.

Referring to FIG. 18, at a step 900, the user of the transmitting device initiates a meeting invitation to be sent to the user of the receiving device in the data processing system of FIG. 6. This initiation of the invitation is carried out by the user operating user controls 170 at the transmitting device in conjunction with information (see below) shown on the display screen 110. The CPU 140 of the transmitting device formats the invitation into a data packet or the like specifying the originating user, the recipient user and any other details specified by the originating user.

At a step 910 the transmitting device transmits the data packet defining the invitation to the receiving device, by means of the CPU 140 instructing the interface 160 to transmit the data packet as a wireless signal. At a step 920, the receiving device receives the wirelessly-transmitted data packet defining the invitation and, at a step 930, the CPU 140 of the receiving device causes details of the invitation to be displayed on the display screen 110 of the receiving device. In response to the display of the invitation, the user of the receiving device operates a user control 170 so as either to accept or decline the invitation.

In the case that the user of the receiving device declines the invitation, at a step 940, control is simply passed back to the step 920 and the currently received packet is discarded.

If, however, the user of the receiving device accepts the invitation at a step 950, then at a step 960 the CPU 140 of the receiving device instructs the interface 162 transmits an acceptance data packet to the transmitting device. At the receiving device, control passes back to the step 920. At the transmitting device, the acceptance packet is received at a step 970 and the fact that the invitation has been accepted is displayed on the transmitting device at a step 980.

Figure 19:
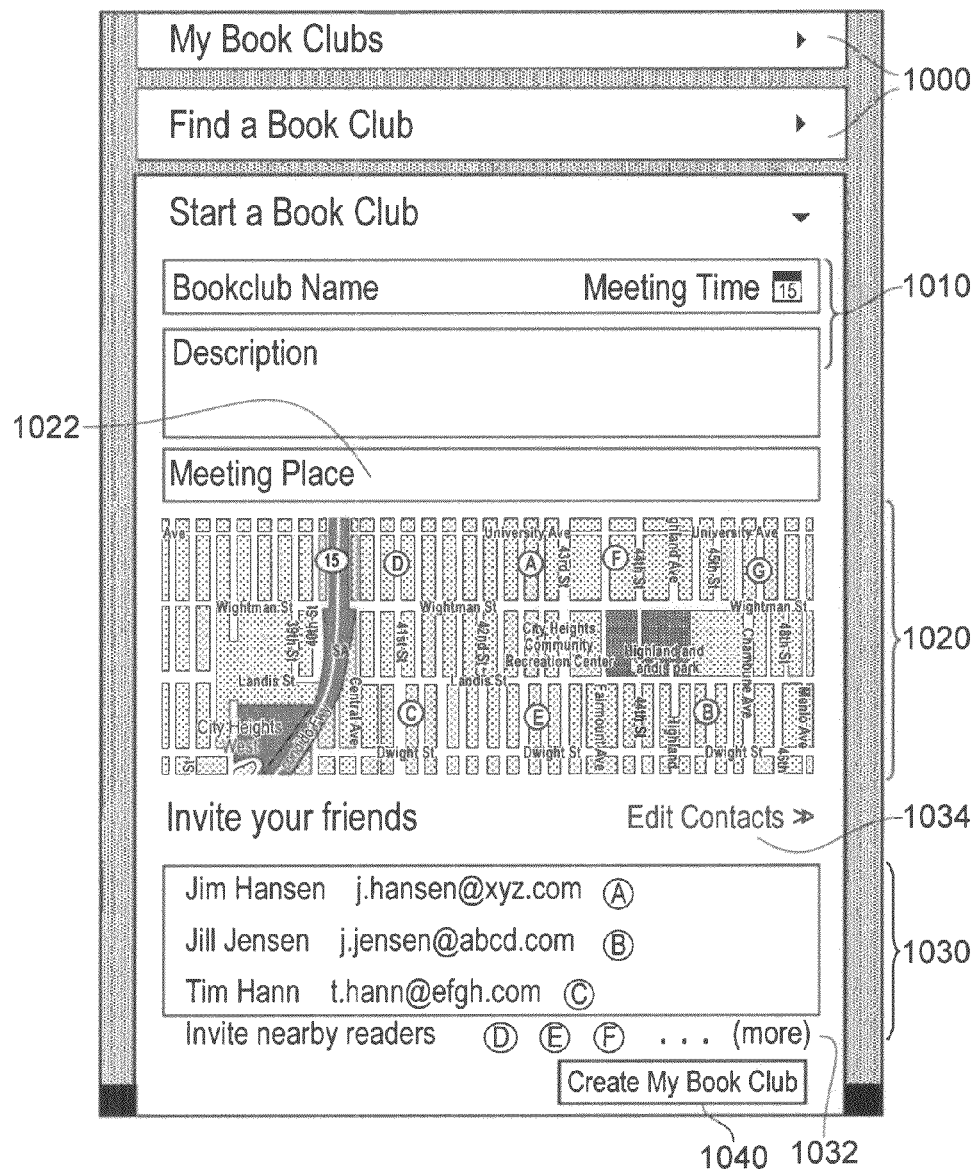
FIG. 19 schematically illustrates a map display of potential members of a book club.
Figure 20:
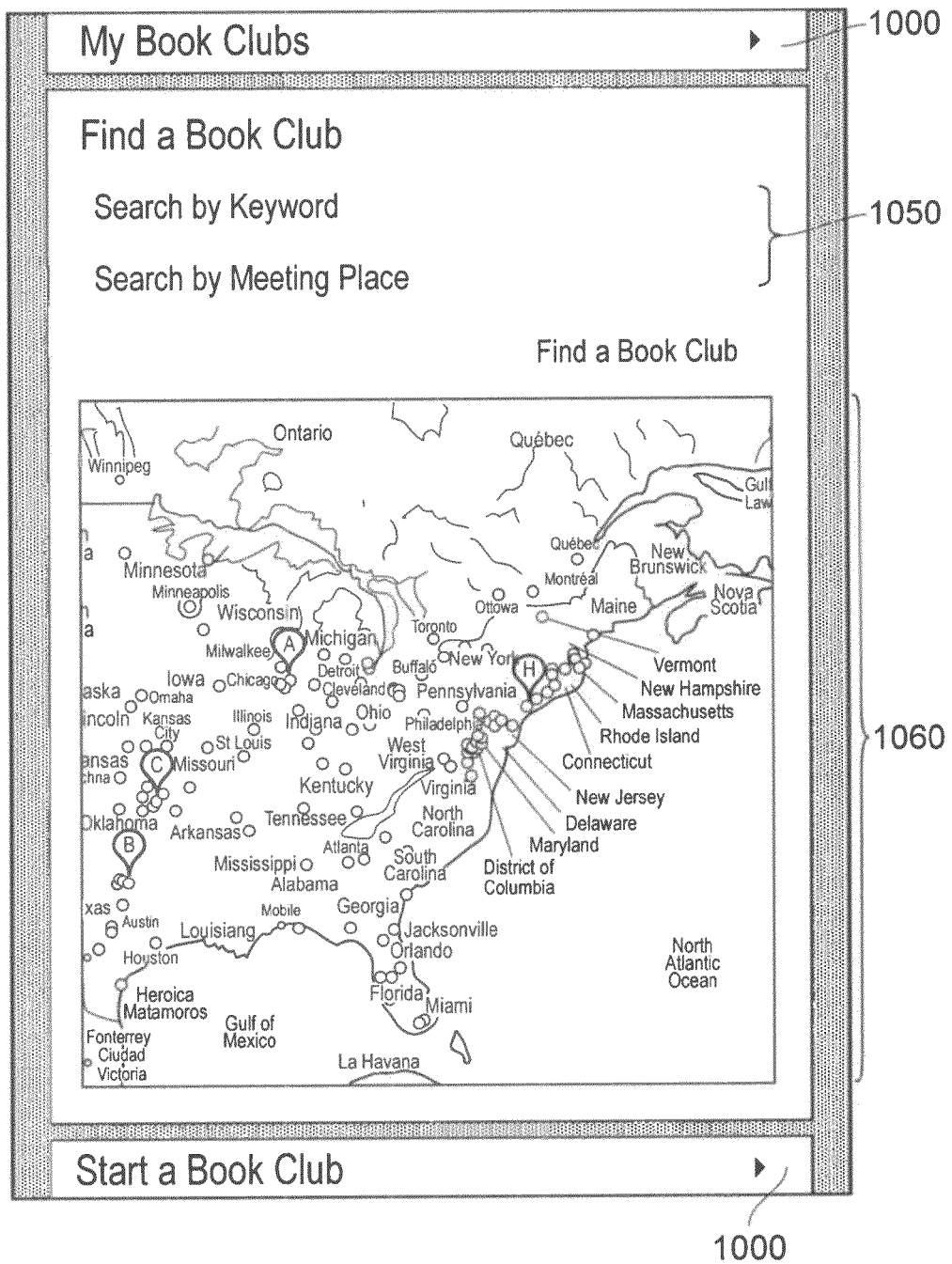
FIG. 20 schematically illustrates a map display of book clubs related to a particular book.
Figure 21:
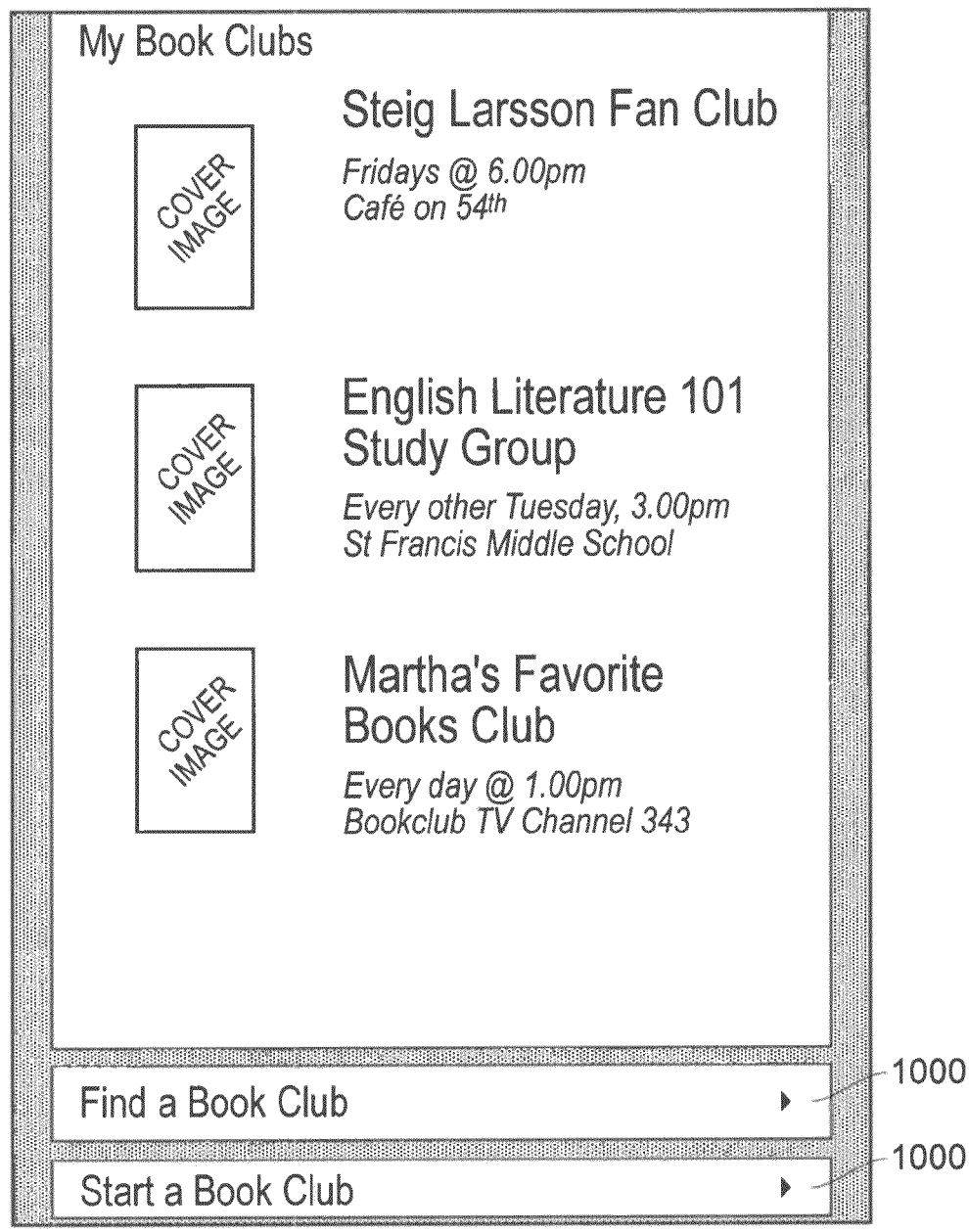
FIG. 21 schematically illustrates a schedule of book clubs held by an electronic book reader device.

FIGS. 19-21 schematically illustrate display pages forming part of control menus associated with the operation of the e-book reader device 100. In particular, FIG. 19 schematically illustrates a map display of potential members of a book club; FIG. 20 schematically illustrates a map display of book clubs related to a particular book; and FIG. 21 schematically illustrates a schedule of book clubs as stored by an e-book reader device. Each of the three display pages includes control buttons 1000 used by a touch screen arrangement to allow the other two display pages to be selected.

Referring to FIG. 19, a data entry screen for a user to initiate invitations to join a book club is shown. In a section 1010, the user may specify practical details such as a book club name, description and proposed meeting time. A next section 1020 provides a map display which fulfils two functions. First, the initiating user can select a proposed meeting place for the book club, for example by typing into a meeting place data entry field 1022 and/or by pointing to a desired location on the map display 1020. A second function of the map display is to indicate the physical location, as notified by location data received from those users, of other e-book reader devices for which the user is either reading the same book as the initiating user or for which the user is interested in books in common with the interests of the initiating user. As mentioned above in connection with the step 870, the display of users can optionally be filtered to include only a list of friends. Each user is indicated by a marker, which in the example shown in FIG. 19 comprises an alphabetical marker A . . . F.

A section 1030 lists any friends who are located within the area defined by the map display 1020 (in this case, the locations A . . . C correspond to friends), and any other nearby readers who are not part of the friends list (in this example, the locations D . . . F are displayed as other nearby readers, and the user has the opportunity by selecting a "more" control 1032 to display further non-friend nearby readers). The user also has the opportunity to select a control 1034 to edit his list of friends.

The user may select friends to invite to the book club by selecting their corresponding letters on the map display 1020 and/or by choosing them from the lists in the section 1030. Once the initiating user has selected the friends to invite and has specified the practical data 1010 and the meeting place for the proposed book club, the initiating user selects a control 1040.

Operation of the control 1040 causes the flowchart of FIG. 18, in particular the step 900 onwards, to be initiated in respect of each of the invited readers for the proposed book club. The data transmitted at the step 910 can comprise the practical information 1010, the meeting place and the name of the initiating user and the recipient user. Packet routing data can also be provided so as to route the invitation packet only to the respective recipient user. Of course, a single packet may be routed to plural recipient users, to save the need to repeatedly transmit the same data to multiple recipients. The acceptance display at the step 980 of FIG. 18 can be provided by, for example, changing the colour or other display property of the marker letters used in the map display 1020 to indicate the location of each user. Of course, the locations may be changing with time, so the map display 1020 can be updated either at predefined intervals or whenever changed physical location data is received.

FIG. 20 schematically illustrates a map display of book clubs related to a particular book (or keywords relating to that book) or a particular meeting place. In particular, in a section 1050 a user may enter keywords relating to a book of interest, for example representing some or all of the title, author's name and the like. A map display 1060 represents the location of the clubs falling within the search results relating to the specified keywords. In order to register a book club for inclusion in this search, a similar process can be followed to the process of Figure 18, except that the user generates a general invitation without specifying a particular recipient, and transmits that general invitation to all users within the data processing system of FIG. 6.

Once the user has established membership of one or more book clubs, the book club page of FIG. 21 can be used to display practical details relating to each such book club.

Figures 22, 23:
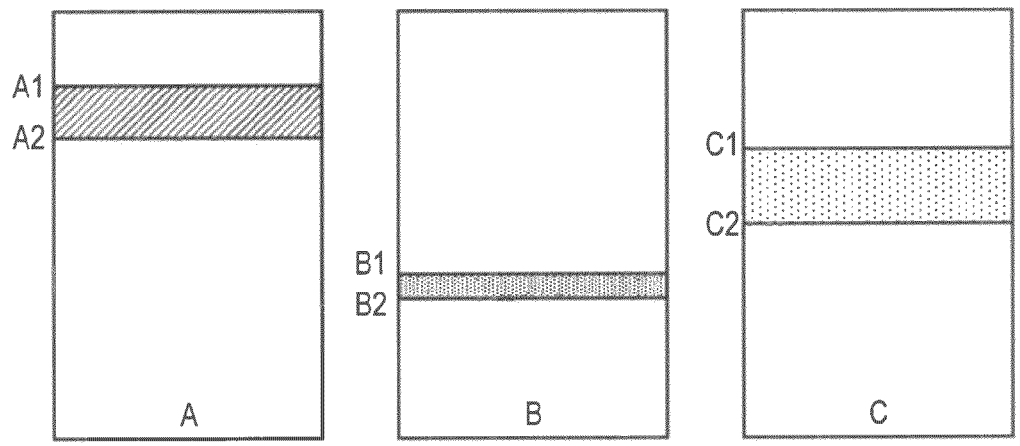
FIG. 22 schematically illustrates segments of three example electronic books which have been selected to form an anthology.
FIG. 23 schematically illustrates a possible format of metadata defining such an anthology.

FIG. 22 schematically illustrates segments of example e-books which have been selected to form an anthology.

In particular, three example e-books, book A, book B and book C are shown. In a schematic form, the books are represented as rectangles, such that the content of the book extends from the top of the rectangle to the bottom. Shaded sections have been selected to form the anthology. In particular, a section running from a position A1 to a position A2 in the book A has been selected, a section running from a position B1 to a position B2 in the book B has been selected, and a section running from a position C1 to a position C2 in the book C has been selected.

The selection of portions to form an anthology can be an intellectual literary work in itself. Although the original books, from which the portions are selected, may have copyright owned by their respective authors, there can be separate copyright in the selection of portions performed the anthology. The anthology can be a saleable work in its own right. The following description will discuss how such an anthology can be sold as an e-book file.

The person responsible for selecting the portions shown as the shaded portions in FIG. 22 generates anthology data comprising metadata defining the start and end points of the selected portions in each book. An example of such metadata defining such an anthology is shown schematically in FIG. 23.

Figure 24:
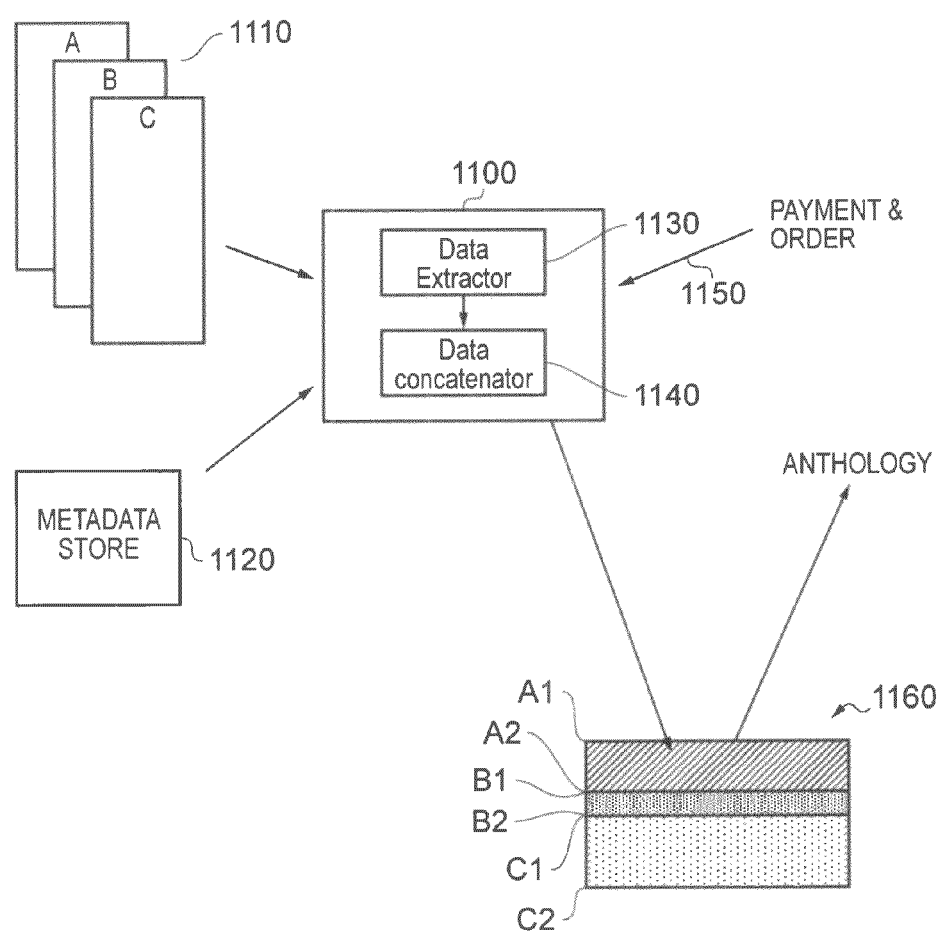
FIG. 24 schematically illustrates the production and sale of an electronic book anthology.

FIG. 24 schematically illustrates the production and sale of an e-book anthology, for example as a single anthology file. A book server 1100 is associated with source files 1110 containing the entire e-books A, B and C and a metadata store 1120 which stores metadata of the form shown schematically in FIG. 23.

The book server 1100 comprises a data extractor 1130 and a data concatenator 1140. In response to confirmation (for example, from a payment server) of an order for an anthology and appropriate payment for that order 1150, the data extractor 1130 retrieves the metadata relating to the ordered anthology from the metadata store 1120. Using the retrieved metadata, the data extractor 1130 extracts the required portions from the book data files 1110. The data concatenator 1140 then concatenates the extracted portions to form the required anthology 1160 which is then supplies to the purchasing user as a download to that user's e-book reader device.

As well as the system making use of the metadata defining the anthology, the extracted material sections (or at least the book data files from which they are extracted) could themselves have associated metadata. Such metadata could provide a reference to the whole of the original book data file, and/or to an internet server or website at which the whole of that e-book could be bought.

Once again, a revenue share can be provided to the manufacturer and/or supplier of the e-book reader device in respect of which the anthology and/or a complete referenced work is downloaded. The techniques described above relating to the revenue share 324 can be used. In other embodiments, particularly applicable to the sale of the referenced complete works, the URL (uniform resource locator) defining the web page from which the complete work may be purchased can be arranged, by the e-book reader device, to include so-called referral data (as part of the URL) defining an entity to which the website selling the complete reference work should direct a commission payment in respect of that purchase.

The techniques described above may be implemented in hardware, software, programmable hardware such as application specific integrated circuits or field programmable gate arrays, or combinations of these. It will be understood that where the techniques are implemented, at least in part, by software or the like, then such software and providing media (such as non-transitory storage media) by which such software is provided are considered as embodiments of the invention. Such a storage medium may be provided as a computer program product.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An electronic book reader device, comprising:
a location detector configured to detect a physical location of the electronic book reader device;
a data receiver configured to receive first reading position data of an electronic book sent by another electronic book reader device and first location data of said another electronic book reader device sent by said another electronic book reader device, the first reading position data including a first current book data file being displayed by said another electronic book reader device and a corresponding first current display position within the first current book data file;
a data transmitter configured to connect to said another electronic book reader device, send second location data of said detected physical location of the electronic book reader device to said another electronic book reader device, and send second reading position data to said another electronic book reader device when said another electronic book reader device is within a predetermined distance of the electronic book reader device based on said first and second location data, the second reading position data including a second current book data file being displayed by the electronic book reader device and a corresponding second current display position within the second current book data file; and
a display controller configured to display an indication of the received first current book data file and the received first current display position from said another electronic book reader device when said another electronic book reader device is within said predetermined distance of the electronic book reader device and the received first reading position data represents (a) the same electronic book as the second reading position data, or (b) an electronic book in which a user of the electronic book reader device has expressed an interest.

2. The electronic book reader device according to claim 1, wherein the data transmitter is further configured to send, to said another electronic book reader device, first comment data including user comments and position data of the user comments within the second current book data file.

3. The electronic book reader device according to claim 2, wherein the data receiver is further configured to receive second comment data sent by said another electronic book reader device.

4. The electronic book reader device according to claim 1, wherein the data transmitter is further configured to send the second reading position data to said another electronic book reader device according to a group affiliation of said another electronic book reader device.

5. A data processing system, comprising:
a plurality of electronic book reader devices, each of the electronic book reader devices comprising:
a location detector configured to detect a physical location of the electronic book reader device;
a data receiver configured to receive first reading position data of an electronic book sent by another electronic book reader device of the plurality of electronic book reader devices and first location data of said another electronic book reader device sent by said another electronic book reader device, the first reading position data including a first current book data file being displayed by said another electronic book reader device and a corresponding first current display position within the first current book data file;
a data transmitter configured to connect to said another electronic book reader device, send second location data of said detected physical location of the electronic book reader device to said another electronic book reader device, and send second reading position data to said another electronic book reader device when said another electronic book reader device is within a predetermined distance of the electronic book reader device based on said first and second location data, the second reading position data including a second current book data file being displayed by that electronic book reader device and a corresponding second current display position within the second current book data file; and
a display controller configured to display an indication of the received first current book data file and the received first current display position from said another electronic book reader device when said another electronic book reader device is within said predetermined distance of the electronic book reader device and the received first reading position data represents (a) the same electronic book as the second reading position data, or (b) an electronic book in which a user of the electronic book reader device has expressed an interest.

6. The system according to claim 5, wherein the display controller of said another electronic book reader device is configured to control said another electronic book reader device to display, as a book to be read, the same book data file, at the same display position, as the electronic book reader device.

7. The system according to claim 5, wherein
the plurality of electronic book reader devices are arranged so that one of the electronic book reader devices is configured as a master device, and the remaining electronic book reader devices of the plurality are configured as slave devices, and
changes in the current book data file and/or the current display position at the master device are transmitted to each of the slave devices by the master device.

8. The system according to claim 7, further comprising a user control, at the master device, configured to indicate a line position within a currently displayed page, wherein
the data transmitter and the data receivers of the slave devices cooperate and display the line position at each of the slave devices.

9. The system according to claim 5, wherein said another electronic book reader device is configured to display an indication of the physical location of the electronic book reader device, as specified by the received location data.

10. The system according to claim 5, wherein each electronic book reader device in the plurality is configured to detect whether other electronic book reader devices have location data indicating a physical location within a threshold distance of a physical location of the respective electronic book reader device and to disregard data received from any of said other electronic book reader devices when any of said another electronic book reader devices is further than the threshold distance from the physical location of the respective electronic book reader device.

11. The system according to claim 10, wherein each electronic book reader device in the plurality is configured to send a meeting invitation to other electronic book reader devices having location data indicating a physical location within a threshold distance of the physical location of the respective electronic book reader device.

12. The system according to claim 11, wherein each electronic book reader device in the plurality is configured to send a meeting invitation to another electronic book reader device when the reading position data of the another electronic book reader device indicates the same current book data file as that of the respective electronic book reader device.

13. A method of operation of an electronic book reader device, the method comprising:
  detecting a physical location of the electronic book reader device;
  connecting to another electronic book reader device;
  receiving, from said another electronic book reader device, first reading position data sent by said another electronic book reader device and first location data of said another electronic book reader device, the first reading position data including a first current book data file being displayed by said another electronic book reader device and a corresponding first current display position within the first current book data file;
  sending, to said another electronic book reader device, second location data of the electronic book reader device, the second location data indicating the physical location of the electronic book reader device;
  sending, to said another electronic book reader device, second reading position data when said another electronic book reader device is within a predetermined distance of the electronic book reader device based on the first and second location data, the second reading position data including a second current book data file being displayed by the electronic book reader device and a corresponding second current display position within the second current book data file; and
  displaying an indication of the received first current book data file and the received first current display position from said another electronic book reader device when said another electronic book reader device is within said predetermined distance of the electronic book reader device and the received first reading position data represents (a) the same electronic book as the second reading position data, or (b) an electronic book in which a user of the electronic book reader device has expressed an interest.

14. A data processing method of a system comprising a plurality of electronic book reader devices, the method comprising:
  detecting, by a first electronic book reader device of the plurality of electronic book reader devices, a physical location of the first electronic book reader device;
  connecting, by the first electronic book reader device, to a second electronic book reader device of the plurality of electronic book reader devices;
  sending, by the first electronic book reader device, to the second electronic book reader device, first location data of the first electronic book reader device, the first location data indicating the physical location of the first electronic book reader device;
  receiving, by the first electronic book reader device from the second electronic book reader device, second location data of the second electronic book reader device;
  sending, by the first electronic book reader device to the second electronic book reader device when the second electronic book reader device is within a predetermined distance of the first electronic book reader device based on said first and second location data, first reading position data to the second book reader device, the first reading position data including a first current book data file being displayed by the first electronic book reader device and a corresponding current display position within the first current book data file;
  receiving, by the first electronic book reader device from the second electronic book reader device, second reading position data of an electronic book sent by the second electronic book reader device, the second reading position data including a second current book data file being displayed by the second electronic book reader device and a corresponding second current display position within the second current book data file; and
  displaying, by the first electronic book reader device, an indication of the received second current book data file and the received second current display position from the second electronic book reader device when the second electronic book reader device is within said predetermined distance of the first electronic book reader device and the received second reading position data represents (a) the same electronic book as the first reading position data, or (b) an electronic book in which a user of the first electronic book reader device has expressed an interest.

15. An electronic book reader device, comprising:
  a location detector configured to detect a physical location of the electronic book reader device;
  a data receiver configured to receive first reading position data sent by another electronic book reader device and first location data of said another electronic book reader device sent by said another electronic book reader device, the first reading position data including a first current book data file being displayed by said another electronic book reader device and a corresponding first current display position within the first current book data file;
  a data transmitter configured to connect directly to said another electronic book reader device, transmit second location data to said another electronic book reader device, and transmit second reading position data to said another electronic book reader device when said another electronic book reader device is within a predetermined distance of the electronic book reader device based on said first and second location data, the second reading position data including a second current book data file being displayed by the electronic book reader device and a corresponding second current display position within the current book data file and the second location data indicating the physical location of the electronic book reader device; and
  a display controller configured to display an indication of the received first current book data file and the received first current display position directly from said another electronic book reader device when said another electronic book reader device is within said predetermined distance of the electronic book reader device and the received first reading position data represents (a) the same electronic book as the second reading position data, or (b) an electronic book in which a user of the electronic book reader device has expressed an interest.

16. A non-transitory computer readable medium storing computer readable instructions that, when executed by an electronic book reader device, cause the electronic book reader device to:
   detect a physical location of the electronic book reader device;
   connect to another electronic book reader device;
   receive, from said another electronic book reader device, first reading position data sent by said another electronic book reader device and first location data of said another electronic book reader device, the first reading position data including a first current book data file being displayed by said another electronic book reader device and a corresponding first current display position within the first current book data file;
   send, to said another electronic book reader device, second location data of the electronic book reader device, the second location data indicating the physical location of the electronic book reader device;
   send, to said another electronic book reader device, second reading position data to said another electronic book reader device when said another electronic book reader device is within a predetermined distance of the electronic book reader device based on the first and second location data, the second reading position data including a second current book data file being displayed by the electronic book reader device and a corresponding second current display position within the second current book data file; and
   display an indication of the received first current book data file and the received first current display position from said another electronic book reader device when said another electronic book reader device is within said predetermined distance of the electronic book reader device and the received first reading position data represents (a) the same electronic book as the second reading position data, or (b) an electronic book in which a user of the electronic book reader device has expressed an interest.

17. A non-transitory computer readable medium storing computer readable instructions that, when executed by an electronic book reader device, cause the electronic book reader device to:
   detect a physical location of the electronic book reader device;
   connect directly to another electronic book reader device;
   receive, from said another electronic book reader device, first reading position data sent by said another electronic book reader device and first location data of said another electronic book reader device, the first reading position data including a first current book data file being displayed by said another electronic book reader device and a corresponding first current display position within the first current book data file;
   transmit, to said another electronic book reader device, second location data of the electronic book reader device, the second location data indicating the physical location of the electronic book reader device;
   transmit second reading position data to said another electronic book reader device when said another electronic book reader device is within a predetermined distance of the electronic book reader device based on the first and second location data, the second reading position data including a second current book data file being displayed by the electronic book reader device and a corresponding second current display position within the second current book data file; and
   display an indication of the received first current book data file and the received first current display position directly from said another electronic book reader device when said another electronic book reader device is within said predetermined distance of the electronic book reader device and the received first reading position data represents (a) the same electronic book as the second reading position data, or (b) an electronic book in which a user of the electronic book reader device has expressed an interest.

* * * * *